United States Patent [19]
Douglass et al.

[11] Patent Number: 5,542,031
[45] Date of Patent: Jul. 30, 1996

[54] HALFTONE COMPUTER IMAGER

[76] Inventors: Clay S. Douglass, 3808 Oaklawn, Bryan, Tex. 77801; Ying W. Chan, P.O. Box 2128, College Station, Tex. 77840; Paul A. Snow, 1406 Village, College Station, Tex. 77840; Benjamin D. Newman, 1504 Laura La., College Station, Tex. 77840

[21] Appl. No.: 55,978

[22] Filed: Apr. 30, 1993

[51] Int. Cl.$^6$ ............................................... G06F 15/00
[52] U.S. Cl. ........................................ 395/114; 395/109
[58] Field of Search ........................... 395/114, 112, 395/109, 117, 135, 132, 128, 101, 115, 116; 358/426, 261.1, 261.2, 261.3, 427, 429, 432, 433, 455, 456, 457, 458, 459, 467, 460, 461, 298

[56] References Cited

U.S. PATENT DOCUMENTS

| | | | |
|---|---|---|---|
| 5,216,753 | 6/1993 | Ng | 395/109 |
| 5,239,625 | 8/1993 | Bogart et al. | 395/128 |
| 5,271,065 | 12/1993 | Rourke et al. | 395/117 |
| 5,335,315 | 8/1994 | Yoshida et al. | 395/109 |

*Primary Examiner*—Mark R. Powell
*Assistant Examiner*—Dov Popovici
*Attorney, Agent, or Firm*—McCormick, Paulding & Huber

[57] ABSTRACT

A computer imager for processing computerized data receives signals in PostScript format. An interpreter generates compressed data signals for presentation to a rasterizer. The rasterizer and interpreter utilize parallel processing and differentiate between character, graphic and contone image page elements, each of which is processed in a different manner to maximize speed and minimize memory and other imager component utilization. Decompressed and rasterized data is presented to a graphics accelerator that includes separate circuitry for processing character and graphics/image data. There is also circuitry to resolve page location conflicts. A halftone unit is included and receives the resolved, rasterized data for presentation to a video interface and ultimately a printer or other output imaging device.

58 Claims, 9 Drawing Sheets

HALFTONE COMPUTER IMAGER

TECHNICAL FIELD

This invention relates to imaging systems in general and more particularly to rational screen computer imagers for color halftone printing characterized by signal processing of compressed data.

BACKGROUND OF THE INVENTION

Screening technology for use in printing halftone images is well known. In general, "halftone" refers to the process of generating a continuous variations of intensity on a printed page using arrays of discrete pixels whose intensity is binary, i.e., on or off. Halftoning is achieved by arraying subsets of the smallest addressable units on a page (i.e., pixels) into a series of units or cells formed by a screen mesh or grid. Pixel density is expressed in terms of dots per inch, while halftone cell density or screen ruling is expressed as lines per inch. A halftone "dot" is formed by selectively printing a number of pixels in a given halftone cell, with the optical density or "darkness" being directly proportional to the number of pixels printed. The gray tones which are available to the printer then are generated by turning on or off a select number of dots within the halftone cell. By switching recorder spots in a halftone cell on or off, a "black" pattern of variable size can be built. This corresponds to the halftone dot. Half toning was initially done with actual photographic screens and now can be done electronically.

Traditional screen printing utilizes printing machines that simulate continuous tone by printing halftone dots on a grid where the number of "on" pixels in the dot corresponds to the continuous tone intensity giving the impression of continuous tone. Color printing using such equipment uses the size grid (screen frequency) for each ink but at a series of angles to give an impression of smoothness and continuous tone. With color printing each color is printed at one of the selected angles. In general, colors are printed at least four different screen angles corresponding respectively to magenta, cyan, yellow and black. These four parameters define screen printing; the screen angle, the screen frequency, dot shape and screen origin. The screen origin is the location of the center of a dot with respect to a corner of a halftone cell. Some color printers are using the same angle and mesh for all the inks but varying the origin to achieve more uniform coverage.

In general, there are two types of screening technology, rational and irrational screening. With a rational screen different colors are spaced at several angles about a common rotational axis. Irrational screening is therefore characterized by screen angles which do not yield mathematically rational tangents. The dot shapes that are typically available include round, elliptical, rounded square dots and Euclidian. A Euclidian dot resembles a black dot in the center at intensities less than 40% and four quarter transparent dots at each corner of a cell for intensities in excess of 60%, with a diamond shape generated for intensities between 40 and 60%. The dot shapes are selected according to the requirements of the reproduction process; requirements which include the printing process, the image content and creating special effects with reticulated screens.

Known imaging systems define the gray levels in 256 steps meaning there is normally a minimum of 16×16 recorder spots (pixels) which must be combined in the halftone cell to produce a faithful reproduction. Consequently, to print a screen with 133 lines per inch (LPI) the resolution must be at least 2,200 DPI (e.g., 133×16=2128). The spot function (i.e. dot function) generator circuitry shapes the cell "spot" and establishes a threshold above which the imager will enable a pixel so that the recorder dot will be switched on. This means that the screening algorithm of the raster image processor (RIP) must step through the spot function for each recorder spot on the film.

It is well known in the art that quality problems include wrong combinations of screen angle and screen ruling lead to undesirable Moire patterns and color shifts when printing. Moreover, dot shape is important in combination with angle and is frequently responsible for structure in single color separations and breaks in vignettes. As is well known, printing problems develop when a colored pattern is generated using a sequence of superimposed but rotated screens. Each screen is at a select angle. However, for perfect reproduction, all of the halftone dots must be identical and located at identical position. This is possible only if the corners of each halftone cell lie exactly on the recorder grid. The resulting angles are represented by the integral offset of X and Y on the recorder grid which defines irrational tangent.

In the past, precomputerized printing processes had observed that the screens located with 30 degree offsets between colors (e.g. screen at 15, 45, 75 and 105 degrees) were preferable. However, these define irrational tangents which are difficult to reproduce using computer imagers. These angle halftone cells do not match the recorder grid and all halftone cells are consequently different. Therefore, the computer must calculate each halftone cell individually, requiring massive computing power to achieve even reasonable performance.

A recent development is the "super cell" corresponding to a screen tile with a number of half-tone dots. The gray levels of the halftone dots within the tile are controlled by multiple precalculated spot functions. Consequently, all halftone dots in a super cell can have different shapes. The super cells are configured such that only the corners of the super cells match the recorder grid. Super cells allow for larger relative precision and better screen angles and screen frequencies than earlier computer imagers. For example, a 9×9 super cell at 2540 DPI can be configured with the irrational number of a tangent of 15 degrees, resulting in a screen angle of 15.0013 degrees.

Those skilled in the art will note that other techniques used by computer imagers such as HQS, accurate screening and balanced screening all are super cell screening algorithms offered by different vendors and differ only in the way that they are implemented. HQS uses angle tiles with halftone dots parallel to the tile edge while balanced screening uses tiles parallel to the recorder grid. The dots within the tile are preangled. Accurate screening combines the two; tiles are angled with the recorder grid in addition to halftone dots that are pre-angled.

All of the prior art imagers are characterized by raster image processors which receives data that is compressed to some extent in order to minimize the amount of data storage needed as well as to reduce processor time. Prior art computer imagers must expand the compressed data to create a bit map of the image. However, it would be advantageous to have a computer imager which processes data in compressed form. The present invention is drawn towards such an imager.

SUMMARY OF INVENTION

An object of the present invention is to provide a computer imaging system for generating halftone images that processing image signals in compressed form.

Another object of the present invention is to provide a computer imaging system of the forgoing type characterized by oversampled intensity map signals.

Still another object of the present invention is to provide an computer imaging system of the forgoing type characterized by halftone cells of programmable ruling.

Still another object of the present invention is to provide an computer imaging system of the forgoing type characterized by halftone cells of programmable dot origin.

Another object of the present invention is to provide a computer imaging system of the forgoing type characterized by halftone cells of programmable screen angle.

Yet another object of the present invention is to provide a computer imaging system of the forgoing type characterized by reduced quantizing error of the spot function.

Another object of the present invention is to provide a computer imaging system of the forgoing type characterized by compressed graphical, image and character data are recognized as distinct from one another and processed accordingly.

Another object of the present invention is to provide a computer imaging system of the forgoing type characterized by vertical scan line compression.

Yet another object of the present invention is to provide a computer imaging system of the forgoing type characterized by an imposer that processes signals corresponding to a single page without the raster image processor (RIP) having to process the entire file for the document.

Another object of the present invention is to provide a computer imager of the forgoing type characterized by an interpreter and a rasterizer that share signal processors for their respective processing operations.

Still another object of the present invention is to provide a computer imager of the forging type characterized by parallel processing.

According to the present invention, a halftone computer imaging system for use in generating signals indicative of a sequence of halftone page images included in a document, with each of the page images having zero or more character, graphic or image element, and with the page including a plurality of halftones cells having one or more pixels, the system includes a controller for receiving command signals indicative of parameters of the page images and generating therefrom imposition signals for configuring said page images in a selected sequence and orientation for printing on one or more printing plates. The system also has an interpreter adapted to receive a document signal file corresponding to the sequence of page images. The interpreter provides for a device for executing the document signal file to generate intermediate executable signal file having therein signals corresponding to at least one of the pages of the document that is rotation and position independent. There is an identifying mechanism for generating signals identifying each element as being a character, graphic or image type element. A device is also included for generating, for each page, display list signals indicative of element parameters for each element on said page. A rasterizer has a compressor for generating compressed element signals in accordance with the identifying mechanism signals, with each of the elements being compressed in accordance with its identified element type. A device is also included for generating character cache signals corresponding to compressed elements identified as characters, as is a mechanism for generating signals corresponding of a list of compressed characters. A graphics compressor is provided for generating signals corresponding to compressed graphic elements including a scan line directory having an order list of signal pointer signals indicative of which scanlines have a graphic element and marker signals indicative of blank and duplicate scan lines in the graphic element. An image compressor generates signals corresponding to compressed image elements with each compressed image element having an lateral (X), vertical (Y) extent on the page and signals corresponding to color. The image compressor further generates signals corresponding to intermediate "image ink" marker signals which point to signals stored in memory associated with the system corresponding to the scan line image data signals for that marker signal. There is also a graphics accelerator for receiving the rasterizer signals and generating therefrom signals for use by an output imaging device for imaging the pages on a medium. The graphics accelerator means has a character unit for use in decompressing signals corresponding to compressed characters received from the rasterizer means. Also, a graphics unit decompresses signals corresponding to compressed graphics and image elements received from the rasterizer means. A "Z" eliminator receives signals from the character unit corresponding to decompressed signals indicative of the character elements and receives signals from the graphics unit indicative of the graphics and image elements. The Z eliminator merges the received decompressed character, graphic and image signals and, if two of the element types are designated for a given pixel, it selects which of character unit signals or graphics unit signals is to be written for the pixel and suppresses non-selected signals. An intensity map generator is included for generating at least one signal set indicative of the intensity magnitude of the pixels included in each of the halftone cells. A halftone unit provides to the output imaging device signals indicative of a selected intensity. The halftone unit has a dot function generator for receiving the Z eliminator output signals for each pixel location and the intensity map generator output signals and providing signals of a selected dot shape in dependence thereupon. There is also a halftone position device for converting the current pixel position on a page to a position in a halftone space scaled therefrom. A comparator is utilized to compare the intensity requested from the rasterizer decompression unit with the intensity of the current pixel received from the dot function generator and generate signals enabling the current pixel should the requested intensity exceed a threshold value.

According to another aspect of the present invention, an imaged article made in accordance with a method for generating signals indicative of a sequence of halftone page images included in a document, each of the page images having at least one character, graphic or image element, the page including a plurality of halftones cells having one or more pixels, the method including the steps of executing a document signal file corresponding to the sequence of page images to generate an intermediate executable signal file having therein signals corresponding to at least one of the pages of the document that is rotation and position independent. Signals are generated for identifying each element as being a character, graphic or image type element. The method also includes the steps of generating, for each page, display list signals indicative of element parameters for each element on the page, generating compressed element signals in accordance with the identified signals with each of the elements being compressed in accordance with its identified element type, generating character cache signals corresponding to compressed elements identified as characters and generating signals corresponding of a list of compressed characters. Also included in the method are the steps of generating signals corresponding to compressed graphic elements including a scan line directory having an ordered list of signal pointer signals indicative of which scanlines have a graphic element and marker signals indicative of blank and duplicate scan lines in the graphic element and generating signals corresponding to compressed image elements with each compressed image element having an lateral (X), vertical (Y) extent on the page and signals corresponding to color. Other steps are generating signals corresponding to intermediate "image ink" marker signals which point to signals stored in memory corresponding to the scan line image data signals for that marker signal; decompressing signals corresponding to compressed characters received from the rasterizer means, decompressing signals corresponding to compressed graphics and image elements; merging decompressed character, graphic and image signals and, if two of the element types are designated for a given pixel, selecting which of character means signals or the graphics means signals is to be written for the pixel and suppressing non-selected signals and generating at least one signal set indicative of the intensity magnitude of the pixels included in each of the halftone cells. The imaged article is thereafter made in accordance with additional steps of providing to the output imaging device signals indicative of a selected intensity, sampling output signals at each pixel location and providing signals of a selected dot shape, converting the current pixel position on a page to a position in a halftone space scaled therefrom, and comparing the intensity requested from the rasterizer decompression unit with the intensity of the current pixel received from the dot function generator and generating signals enabling the current pixel should the requested intensity exceed a threshold value.

DESCRIPTION OF THE PREFERRED EMBODIMENT

Figure 2:
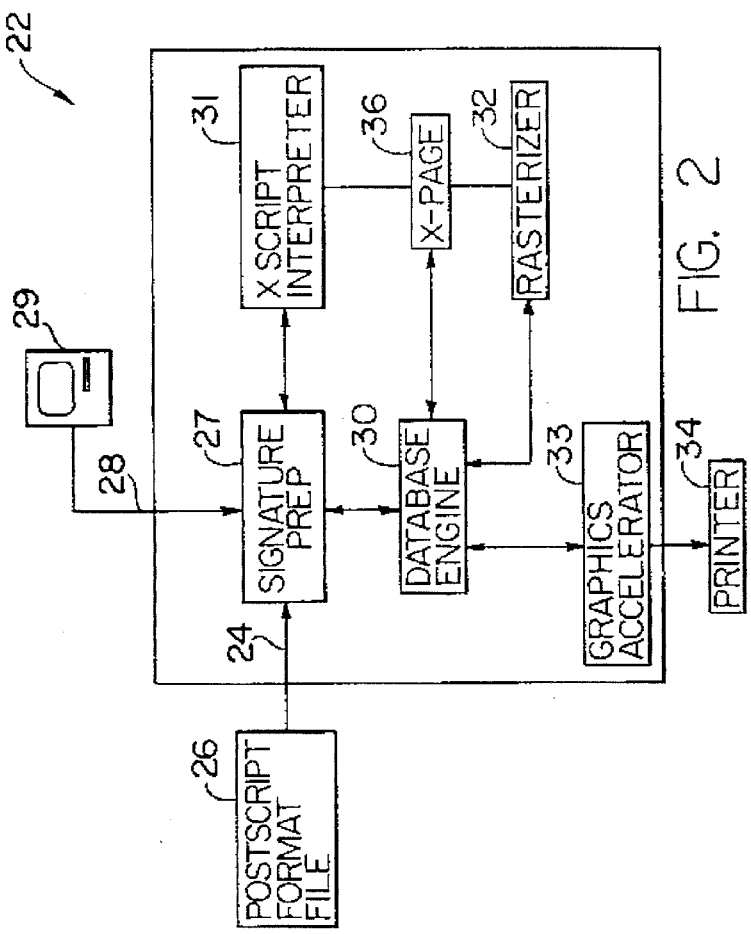
FIG. 2 is a simplified schematic illustration of a computer imager for halftone printing provided in accordance with the present invention.

Halftoning is the process upon which the printing industry must rely in order to produce a page using only black or color ink and white paper that appears to the human eye to include shades of grey and color. For a theoretical 50% tone, turning on every other pixel would yield the desired 50% value (grey for black and white images). However, this approach is subject to problems, such as the inability of printers or recorders to print single pixels. Also, the physiology of the human eye is such that turning on and off every other pixel is not perceived as 50% grey. Similar problems afflict other values of tone in the continuum between 0 and 100%.

As noted above, imagers generally configure a cluster of pixels as a dot or halftone cell. Shown schematically in FIG. 1 to illustrate the problem is a 3 by 3 array 10 of pixels 12 that comprise a halftone cell with an ideal circular dot 14 contained therein. Also shown is an overlaid cell 16 rotated a select amount (15 degrees) about a given corner of each cell. As is readily seen, the pixels 18 of the cell 16 do not exactly lie on top of one another, nor then does the ideal dot 20. The result is a composite dot of distorted shape.

Generally, halftoning is performed at specific angles with specific meshes; a mesh refers to the frequency of these clusters or dots of pixels along the major screen axes or angles. Meshes of between 60 to 100 are common for newspapers, with between 130 to 200 mesh for magazine quality and color work. The mesh refers to the frequency of dot centers per inch, so 133 mesh would have 133 halftones cells per inch. If data of this format were being output to a 1200 dpi machine about 9 pixels between dot centers would be generated, yielding 81 pixels arranged in a 9×9 grid distributed to each dot. This establishes a theoretical limit for each particular dot of 81 different possible intensities for this example. Alternating dots between two intensities generates an apparent intensity between them. If a 50% grey was desired with the 81 dots as above, the present imager alternates between dots containing 40 pixels and dots containing 41 pixels to get the effect of a 40½ pixel "on" or 50% grey.

For color printing these dot centers are aligned with the different planes of colors. That is; the different inks used in printing (cyan, magenta, yellow and black) are aligned at a different angle. Typically, even separations are used, like 15/45/75 and 105 degrees, which are all 30 degree apart. When halftones dots with these meshes are printed on top of each other, the result is what is referred to as a rosette pattern, a circular pattern with radial spikes made by the dot centers. Circular patterns are preferred as they are not as distracting to the human eye as are other pattern geometries. Moire patterns are also a problem with halftone printing, but a circular Moire pattern caused by the typical or normal angles of 15/45/75 and 105 degrees are not as noticeable by the human eye.

Referring now to FIG. 2, there is shown in simplified schematic form an illustration of a computer imager 22 provided according to the present invention. The imager receives input signals on line 24 in PostScript format from a front end processor indicated at 26. The present system also includes control apparatus 27 for executing control functions for the imaging system in response to received external command signals. In the preferred embodiment the apparatus 27 is referred to as "SignaturePrep". Primarily, SignaturePrep provides imposition and stripping functions for received data signals. These overall operations detailed hereinafter are best understood by way of reference to FIG. 10.

SignaturePrep receives input command signals on lines 28 from an input device 29 indicative of the print job parameters such as page margins, number of pages in the document, the number of pages per plate, etc. from which it computes compensation for bottling and shingling, gutter margins and the like, as well as the page orientation and layout for each plate. These signals are stored in database engine 30 for controlled access by other elements of the present imager. Furthermore, the present imager divides the input data into a subsets referred to as "tiles" as more fully explained hereinafter.

The input data signals are ultimately received by an X-script interpreter 31 which is written in "Fifth" computer language. The X-script interpreter generates a sequence of display lists which are presented to a rasterizer 32 that is written in C computer language and has the ability to address 16 million by 16 million pixel arrays. Those skilled in the art will note that other rasterizer embodiments are encompassed by the present invention, including ones written in 68000 assembler.

The output from the rasterizer constitutes compressed graphics and is presented to a graphics accelerator 33. The graphics accelerator as described hereinafter takes the compressed graphics signals and generates therefrom signals corresponding to pixels in a bit map image of the page.

Under the control of SignaturePrep, multipage electronic documents in PostScript are first processed by the X-page interpreter to generate a series of electronic files representing each page in the original document in a relocatable, scalable and rotatable manner. These pages along with printers marks are combined by the imposer to produce electronic continuous tone color descriptions of printing plates organized for a press size, paper thickness and folding pattern. In the preferred embodiment SignaturePrep performs the functions of the imposer. However, those skilled in the art will note that in other embodiments other apparatus may do the same.

These plate descriptions are subsequently converted to compressed raster format by the rasterizer at a specific dpi, lpi and plate size. The compressed raster data is converted by the graphics accelerator to N halftone pixel signal streams and thereafter imaged on to M plates by an output imaging device such as a LE-55 printer marketed by the Gerber Scientific Instrument Company.

As detailed herein, the compressed data representing one or more pages is processed through character and graphics decompression units of the graphics accelerator and then are provided to the Z eliminator, the halftoning unit and finally to the output interface. Final signal output of the imager is a superset of sets of scanlines of output pixels where each scanline set represents the component of the original document to be represented with an ink having undergone expansion and merging of the original compressed data. This superset is presented to a pixel oriented output imaging device 34, such as a film recorder, laser printer, video or direct plate device. The present system also accepts interactive PostScript documents from serial signal sources such as "Appletalk" and "Ethernet" format local area networks (LAN) as well as PostScript format documents from parallel signal sources.

Input signals to the imager are files, preferably in PostScript format, which correspond to one or more pages to be provided to the output imaging device. As is well known, bound printed material does not comprise individual sheets each with a single page, but rather a series of large multipage sheets folded, cut and arranged into the final sequence of pages. As detailed hereinafter, one of the functions accomplished with the present imager is to generate output signals corresponding to a series of multipage plates, with selected pages on a single side of each plate.

Figures 7, 10, 11:
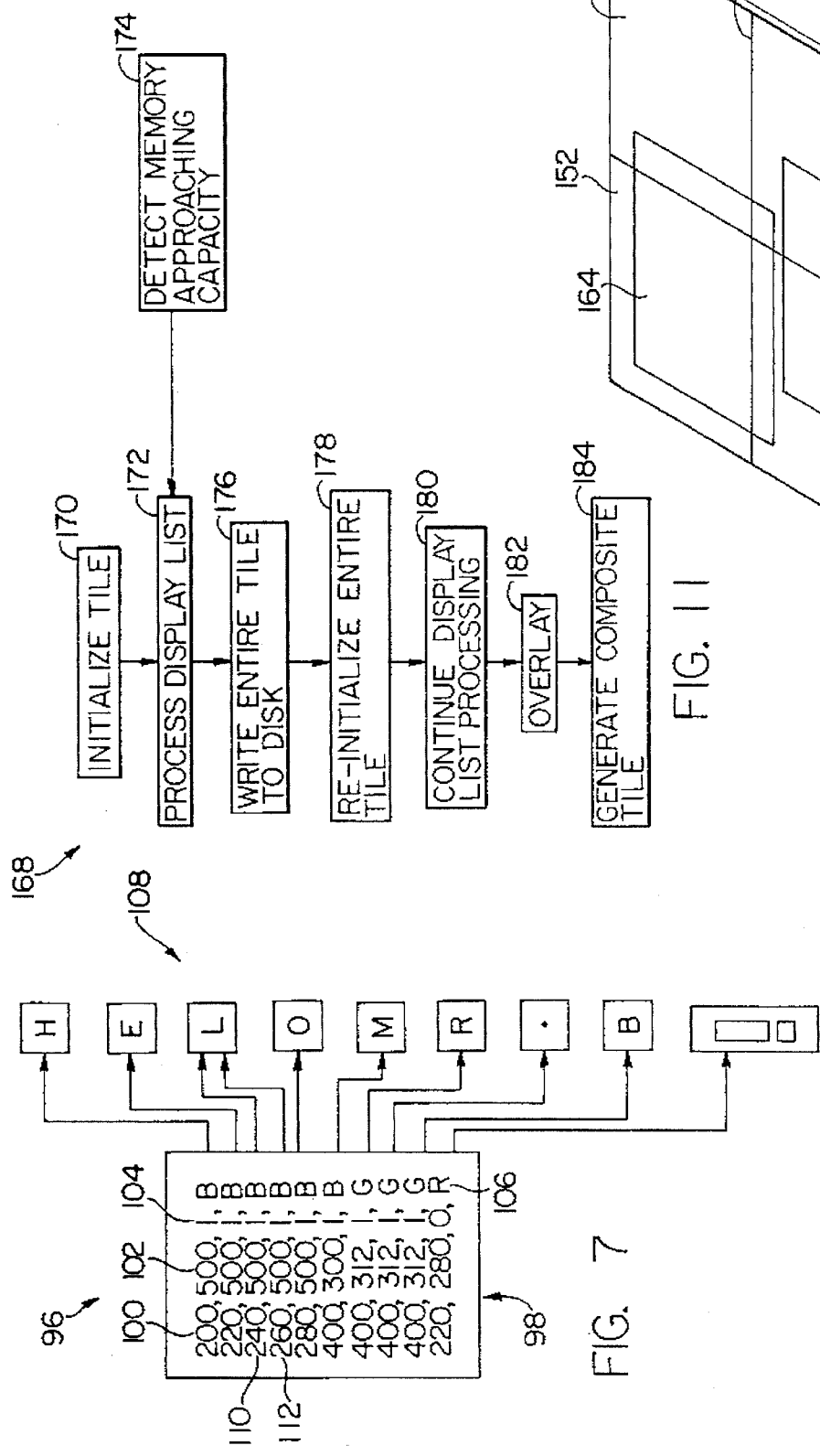
FIG. 7 is a diagrammatic illustration of a display list and character cache generated by the computer imager of FIG. 2.
FIG. 10 is a schematic illustration of a printing plate showing the relationship page and tile data format in the imager of FIG. 2.
FIG. 11 is a diagrammatic illustration of an algorithm executed by the imager of FIG. 2.

Referring now to FIG. 10, there is shown in schematic form an illustration of a printing plate 150 divided into four pages 152, 154, 156, 158 separated by boundaries 160, 162. Each page is comprised of the text, images and graphics as well as the margins necessary for producing the printed document. In the black and white printing process, each sheet of paper which is laid over the printing plate to be imaged is then subsequently placed on a second printing plate to receive the remainder images on the unprinted, back side, yielding a sheet printed on both sides. Thereafter, the paper sheet is removed and folded into quarters to form one of many folded inserts that comprises a book or magazine.

Lay up of each printing plate into the appropriate pages has been done manually in the prior art. This would include the determination as to which pages are placed on which plate and in what orientation. This process is clearly necessary, since when the paper sheet is folded, it must be folded so that the pages appear sequentially in the book and with the proper orientation.

In order to accomplish this automatically, the present imager, through SignaturePrep, receives information on the particular job that is being executed such as the kind of plates and the inks, etc. SignaturePrep generates its command signals in response to this information. As previously noted, it will also determine the extent of any gutter margins as well as the amount of compensation needed to mitigate the effects of bottling and shingling.

The input signals presented to the halftone unit are controlled in part by a device referred to as an imposer which decides what pages or portions of plate regions are to be presented to the halftone unit and comprise part of the video interface. One of the functions of the imposer is to select where the pages are located and in what orientation they have so that the printed sheets have the desired order when folded. In addition, the imposer adjusts the position and rotation of the page to correct for shingling and bottling due to the thickness and rotation of the paper. Preferably, the imposer produces an arbitrary number of files depending on the number of processors available.

In a point of departure of the present invention over the prior art, SignaturePrep divides the data which comprises a plate into "N" number of subsets referred to as "tiles". Each tile 164, 166 in FIG. 10 then contains a portion of one or more pages of data. Tile 164 includes a portion of all three pages, while tile 166 includes portions of only two pages. In the preferred embodiment, SignaturePrep is responsible for tagging the data with its associated page. When the data is ultimately assembled, after processing, SignaturePrep then locates the processed data signals with its proper position on the page.

The "tile" then becomes the internal working unit for the imager during this portion of the signal processing. In the preferred embodiment a tile comprises the text, graphics and image data for approximate equal to a signal page of paper plus the margin. As detailed hereinafter, a single tile is what is processed by a given parallel processor. SignaturePrep is able to determine most efficient use of the processor resources available and determine the order in which the tiles are to be processed through the available signal processors. The tiles as a recognizable subset of data are lost ultimately in the assembly process.

The present imager can generate multiple files corresponding to the individual pages which are pasted into an image of the plate. Alternatively, a single file containing multiple tiles can be generated with a pointer retained for designating the page information for the data in each tile. Consequently, individual pages can be separately processed. In general, the tiles can be individually processed in parallel by individual RIPS. By use of a compression algorithm of the present invention, the imposer can remove a scan line from one compressed tile (or data file) and append it to the end of another data file to yield adjacent pages.

Moreover, the present imager can arbitrarily split pages to be processed independently by different RIPs using the tile designation. SignaturePrep as the imposer will then assemble the plate, taking scan lines from several different RIPS using a tile merger apparatus also configured with SignaturePrep in the preferred embodiment. The number of files does not have to match the number of pages being processed. A significant advantage of the present invention is that the data configuration as set forth above allows for last minute changes in the page content.

Those skilled in the art will note that a tile may comprise one or more pages of data or alternatively may be configured to comprise less than a page. Also, as shown in FIG. 10, a tile may extend beyond page boundaries 158, 160 incorporating data from adjacent pages.

A tile merger apparatus is also provided by SignaturePrep for reading multiple tiles from the database engine and thereafter assembling the tiles into the pages taking compressed signals from several tiles and scaling those signals onto the page. SignaturePrep instructs the graphics accelerator as to what tiles are to be decompressed and in what order to arrange the tiles on the printing plate to form the desired page layout.

Input data to the imager is in the form of a multi-page PostScript file which is to be processed into signals corresponding to the print on a series of plates. The pages in the present invention are dealt with on individual basis and are not treated as one file, as in the prior art. This presents a difficult problem because PostScript is a programming language, so a PostScript file is really an executable program, not a data file. Consequently, part of what is, for example, page 32 may depend on code executed or procedures defined with respect to page 1.

In the past, some have attempted to solve this problem by analyzing the PostScript input signals and providing an additional algorithm to split the received program into separate page files based on the analysis of the associated output drivers. However, this approach requires the operator to write new driver code for each application whose output signals are to be accepted by the imaging system, even for each new version of PostScript or output driver software. A printer, therefore, receiving PostScript files would be required to invoke a filter specific to the application (e.g., Quark, Freehand) which composed the particular document.

In contrast, the present invention supports a modified version of a PostScript compatible interpreter referred to by the trademark X-SCRIPT. An advantage of the present interpreter is that it is appropriate for any valid PostScript code regardless of source. The present interpreter has two interpretation operations. In the first, the source PostScript code is read and executed. With each "showpage" or "copypage" command, new PostScript code associated with a page is generated which represents the current graphic state. This new PostScript code, when executed, will produce exactly the same output the original code would have produced, except the new code will be guaranteed to be position and rotation independent.

In the second case, instead of producing a new PostScript code, the present imager generates a display list consisting of the graphics commands the interpreter normally sends to the graphics engine in the present invention. An advantage of this second case is that it is more efficient since there are no subsequent interpretation phases to produce final output. Thereafter, the display list is refined in two ways. Initially when given multi-page PostScript source code, the present imager creates a single display list that contains a display list for each page. This multipage display list is sometimes referred to as a display list database. A directory at the end of the file gives the position of each of the page's data in that file. The second refinement involves character handling.

In addition to the interpreter disclosed above, the present imager includes an intermediate interpreter 36 referred to by the trademark "X-page". The purpose of the intermediate interpreter is to allow for buffering of the output of the X-script interpreter. In prior art imagers, the output of the interpreter is immediately consumed by the rasterizer. However, X-page allows the imager to write and save to a memory device 38 data corresponding to discreet pages which can thereafter be read by the rasterizer. Prior art imagers are unable break the interpreter/rasterizing processes into separate, discreet operations since the programmable nature of the PostScript file precludes data for each page from being self contained.

Figure 3:
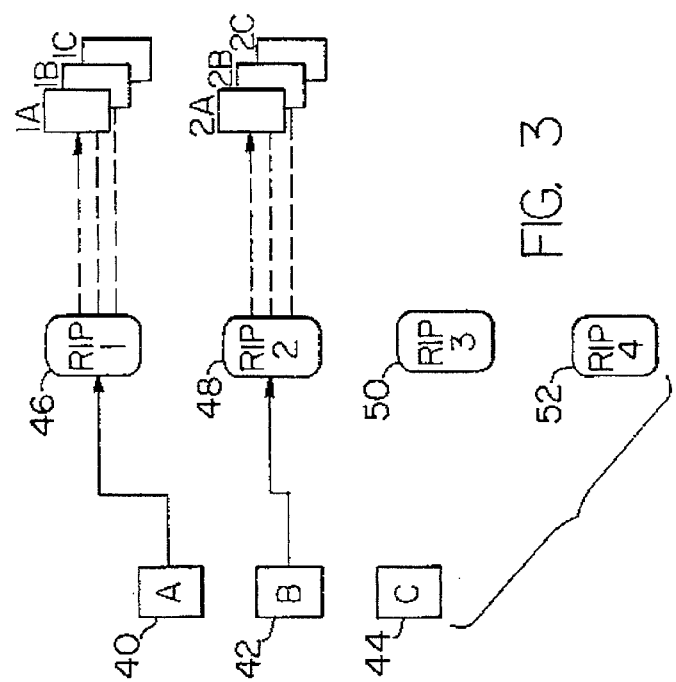
FIG. 3 is a diagrammatic illustration showing a first possible mode of parallel processing by an interpreter and rasterizer of the computer imager of FIG. 2.
Figure 4:
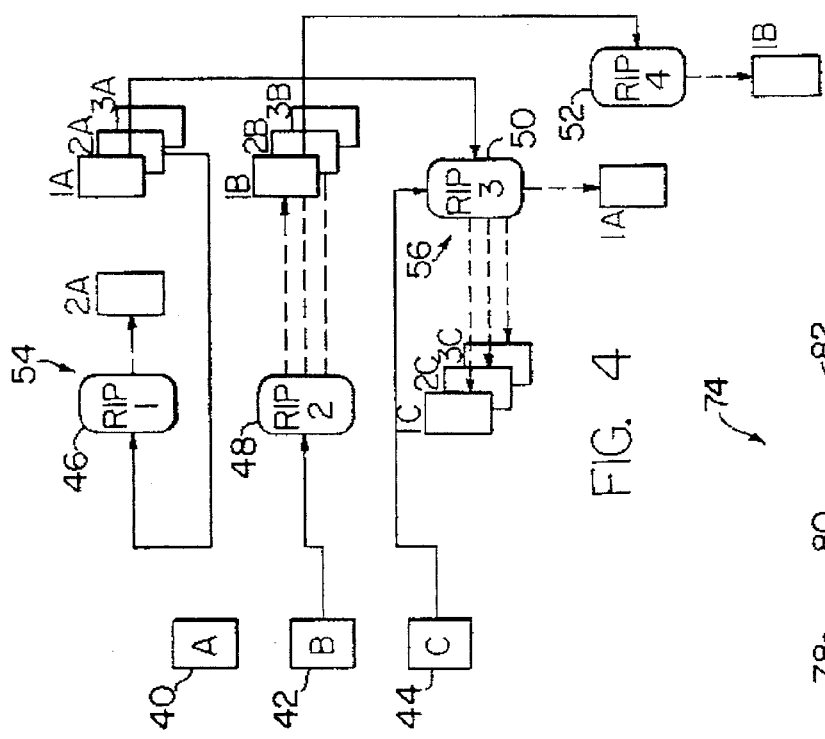
FIG. 4 is a diagrammatic illustration showing a second possible mode of parallel processing by an interpreter and rasterizer of the computer imager of FIG. 2.

With the present invention, the PostScript compatible interpreter and rasterizer are split into two separate processes which are operated totally asynchronously. Processors associated with the interpreter and rasterizer are configured to perform either operation upon command. For N processors, any arbitrary number can be interpreting and rasterizing at any time. Exemplary operation is shown in FIGS. 3 and 4. For three multi-page PostScript input files, 40,42 and 44 (A, B and C), with the interpreter and rasterizer employing four common raster image processors (RIPs) 46, 48, 50 and 52, (1,2,3 and 4) a possible sequence of signal processing can be as follows.

Initially RIP 1 starts to interpret file A producing page files, 1A, 2A, 3A, . . . RIP 2 begins to interpret file B producing page files 1B, 2B, 3B, . . . . Thereafter, RIP 3 begins rasterizing page 1A and RIP 4 begins rasterizing page 1B. RIP 1 then finishes interpreting file A and begins to rasterize page 2A indicated at 54. RIP 3 finishes rasterizing page 1A and begins to interpret file C indicated at 56. The process continues accordingly until the complete file has been rasterized.

In the preferred embodiment, the individual RIPS are co-processors configured on a conventional AT bus. The RIPS can be in any number of different configurations based on the above. For example, multiple processor cards on a different bus (e.g., VME or NUBUS) could be used or the multiple processors may be implemented on a single card. In fact, the RIPS need not be all in the same unit, but can be multiple machines tied together on a network.

An advantage of the present imager is that the multiple RIPS when combined with the "X page" process detailed above allows for extensive parallel processing of PostScript files. This capability of the present integer stems from the fact that the hardware is shared between the interpreter and rasterizer. The ability to parallel process the PostScript input file is achieved by dividing the final output region into an arbitrary number of continuously smaller regions on the page and rasterizing each region separately. This especially helpful when the output format of the document is large. For example, with a four-up printing plate (i.e. four separate pages) the plate can be split into four regions. It is not necessary that a graphic component of a plate, such as a page, be entirely in single regions.

Graphical components may be split across the regions. Initially the input file is processed through the X-page interpreter to produce a display list file. Graphical component are assigned to the regions of the pages which they impact. Each region of the final plate is then rasterized which can be accomplished in parallel on four separate processors. The final image for the plate is then assembled by assembly hardware as the plate is being printed.

This feature of the present imager is unique in two ways. First, the prior art builds a single PostScript file which represents the entire plate. This demands enormous memory consumption. For a 20 inch by 20 inch plate at a resolution of 3810 dpi, the bit map needed to represent the entire plate will require 725 megabytes of memory. A 40 inch by 40 inch plate would nearly require 3 gigabytes of memory. The present imager divides the graphic elements of the final output into separate files which can be dealt with individually.

The size of the processing problem is reduced by dividing the plate into arbitrary, continuous rectangular regions and separating the input PostScript files so that the imager can associate a region only with the code signals that it effects. This lessens the demands of memory needed for processing. When this feature is utilized in combination with the compressed graphic aspects set forth herein, the present imager never requires more than some limited number of megabytes of memory at one time.

Other implementations in the prior art have used a technique referred to as "banding". The output region of a page in these machines is divided into N continuous rectangular regions and the PostScript code that represents the final output is executed N times accordingly. Each successive pass through the interpreter is done with a "clipping region" set around the band so that only that band is imaged. Other known machines produce a display list on the first pass and then run the display list through a rasterizer N times with the clipping regions set which define the band. The disadvantage of the prior art is that all data must be processed on every pass, including data which it identified with regions outside the band of interest. The present imager allows each pass to deal with only the data that effects that region in the current pass.

Figure 5:
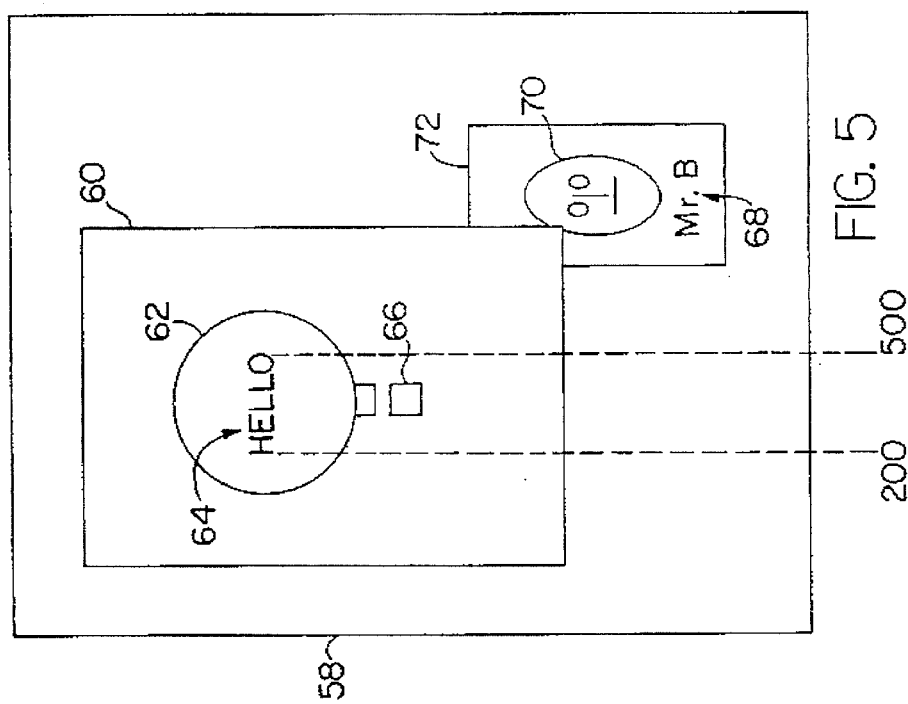
FIG. 5 is a diagram containing a page of character graphic and image elements processed by the computer imager of FIG. 2.

Referring now to FIG. 5, there is shown in simplified schematic form an overall printed page 58 which is to be compressed and then printed on a medium by the present imager. The overall printed page is comprised of several types of representations or elements, each of which are handled differently by the present computer imager. In general, the pictorial representations that comprise the page include characters or text, graphics and image data from scanned pictures. On the page there is an outline of a box 60 with circle 62 inscribed therein. Characters 64 spell "hello". Behind the inscribed circle is a large exclamation point 66. Other characters 68 form "Mr. B" with an image 70 of a face thereabove, all contained within a graphical border 72.

Compressed elements as processed by the present image are in several different forms depending on the kind of data of which they are comprised. Generally there are characters, graphics and images. Characters are the letters etc. which are repetitively used on the page and can have a variety of fonts and point sizes. Graphics in general are polygons, circles, etc. comprised of line segments which together generate a closed form. Images are typically contone data generated by scanners and the like and are comprised of data signals which vary continuously in gray scale magnitude. Each of these three types of data are processed and compressed differently by the present imager.

Those skilled in the art will note that as used herein "compressed characters" can refer inclusively to those embodiments in which the character elements are compressed and those as in the preferred embodiments where the characters are not "compressed" from a bit map image, but comprise a representation of the character that requires less memory and data manipulation than a corresponding bit map image and therefore are also considered to be compressed.

Also note that there are some graphics or images which are generally graphic in nature but are processed by the present imager as characters because the character compression mechanism as detailed hereinafter is more efficient. These specific instances are identified when the imager determines there to be some computational advantage. For example, vertical lines are processed by the present imager as characters because of efficiency.

Characters tend to be repetitive data within an individual display list. In a multi-page PostScript source file the same characters will tend to be used over and over again from page to page. The display list representation of the character is rather large, so that it would be burdensome to write out the description pixel by pixel each time a character is called. Instead the present imager assigns each character a unique indemnifier. The present imager writes a table of identifiers at the end of the file that associates identifiers with the positions of the character descriptions in the display list. This allows the font cache to be written out to memory for subsequent execution. Those skilled in the art will note that all PostScript interpreters implement a font cache internally. Characters which are filled, of a different font, different line width or of a different point size are unique in the present imager and are separate characters processed accordingly.

The configuration of data into characters and their subsequent manipulation represent an important point of departure of the present invention over the prior art. The present invention in this respect is not limited to the print media. Rather, it extends beyond to other areas such as the fabrication of semiconductor devices. It is well known that the production of integrated circuits relies on the generation of optical patterns, typically on photolithographic emulsion or film, which define the features of the various transistors, resistors, etc. The patterns are repeated thousands of times throughout on a regular basis and as such correspond to "characters" as used in the present sense. Manipulating the full, uncompressed data of these features is slow and resource intensive. However, the signal processing of characters with the present imager is readily adaptable to signal processors used to generate semiconductor devices such that "compressed" representations of features provides for a tremendous reduction in the hardware and software required for these applications.

As noted above, the PostScript files are presented to the X-SCRIPT interpreter where they are converted into a sequence of display lists. The display lists generated by the present imager are substantially more complex then a traditional display list known in the art. The present display lists include complete character outlines as well as information regarding font cache management, complex clipping regions, complex shapes, and set screens. Other entries in the display lists are for output size of the characters (in pixels), fill method, color, complex shapes, character placement, screening information and continuous tone data.

Traditional display lists contain only character placement and convex polygons which are to be processed onto the printed page. Concave polygons are those graphics elements, such as a star, in which line segments turn back towards a center to form an outward facing angle. Convex polygons are those in which the line segments form inwardly facing angles and are simpler for imaging systems to process. In contrast, the present imager has polygon shapes which are not required to be continuous or convex in the display lists. The display lists generated by the present imager are presented directly to the rasterizer which converts them into compressed graphics.

The display lists include an accurate list of plans which determines the size and pixel signals for a given output page. They also determine the filled characters and initiate the construction of the atrium font cache and generate the end character which terminates the entry of the constructional character in the font cache. The display lists establish the set character which places a character that has been previously decoded to the font cache onto the page's specific X, Y location in the current color. Display lists include the set color command which sets the current color and shape which rastorizes a complex polygon or set of polygons into the bit map in the current color using the current clipping region. It also determines the value of the "define clip" parameter which defines the clipping region "clip path" a parameter which identifies a currently active composite clipping region. If there are multiple clipping regions the present imager returns the intersection of those clipped regions, determines the kind of "fill" that is used as well as executes odd shape commands.

Also in the display list are entries for colors. For example, the letters "Mr. B" have the entry "G" on the display list for gray. A pixel in a four color system would have a color parameter indicating in addition to black, for example, twenty percent (20%) cyan, thirty percent (30%) yellow, and sixty percent (60%) magenta and then each of the those inks would have some screening information associated therewith.

Another point of departure of the present invention over the prior art is the use of a transparent ink as a color throughout the compression process. With the present invention each pixel has a color with there being a specified "transparent" ink as a distinct color. Prior art imagers generate a transparent ink equivalent by using a combination of the CYMK ink colors. However, for simple black and white images, there is no distinct combination which can yield a transparent ink.

Note that the term "transparent" ink has also been used with the present invention to describe character elements. However, those skilled in the art will note that for characters there is either an ink, no ink, process. The use of a transparent ink is reserved for graphic and image elements.

While the addition of a data corresponding to a transparent ink represents an increase in the signal processing required of the present imager, the benefits obtained by the other compression and decompression schemes as detailed hereinafter allow for the same without placing unreasonable demands on the signal processing circuitry and memory requirements. The only reason that the present imagery can employ this configuration is because the present imager compresses and processes data in a compressed format throughout the signal generation process.

Figure 6:
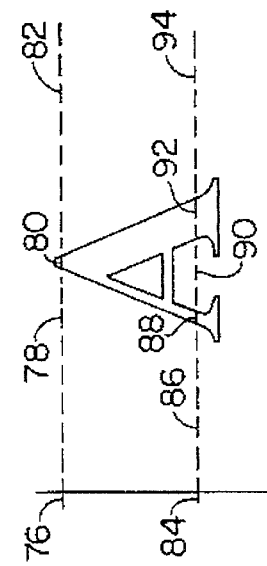
FIG. 6 is simplified diagram of a character processed by the computer imager of FIG. 2.

Shown in FIG. 6 in simplified schematic form is an illustration of a letter 74 printed on the page by a computer imager provided in accordance with the present invention. The letter is of a standard font and size and is characterized by a sequence of pixels which can be represented in both bit map form or by in run-length compressed form as provided by the present imager.

In general, the letter "A" is characterized by a sequence of scan lines of two types, the first being the type that has only a small fraction of the pixels which correspond to dark areas with the remainder of the scan line being alternatively referred to as "white", "transparent" or "no write" pixels. The second type being scan lines which will transit from a run of transparent to a run of black in sequence. The latter scan line type may be compressed in a form which allows for minimal data, and hence minimal memory size. For example, scan line 76 comprises a long run 78 of transparent pixels. The scan line just does intersect the upper portion of the letter "A" such that second run of 80 of that scan line will be dark pixels. Lastly, the scan line is completed by a long run 82 of transparent pixels.

Both the transparent ink which precedes the letter "A" and the dark ink region itself constitute information that needs to be retained after the compressions process. However, the transparent region of the scan line passed the trailing end of the character is not retained, as there is no need to compress pixels having no information. The present imager retains the information concerning the transparent area proceeding the first ink run because the insertion point of the character which is at the lower left hand corner must be retained, depending upon whether the pages rolled right-side-up or upside-down on the page. The present imager requires the origin of the character to be added to the first transparent run of the scan line to correctly place the ink run which follows thereafter. Only signals indicative of the end of a scan line need be retained.

Scan line 84 demonstrates a region comprised of alternating runs 86, 88, 90, 92 and 94 of transparent, black, transparent, black and lastly of transparent which are to comprise the leg portions of the letter "A". The characters are stored in a font cache in the rasterizer and can be accessed when necessary by the imager. There is one character image stored in compressed format for each of the letters in a variety of fonts, scales and rotations.

The scan line 84 crosses both legs of the "A" so it has two ink runs. It is instructive to examine the data consumed by the characters compressed by the run length encoding scheme of the present imager. If, for example, a 12 point "A" is to be compressed in 1200 dpi pixel density, the 12 point "A" would be approximately a tenth of an inch to a side. Consequently, if a simple bit map representation of the same was retained it would be 120 pixels to a side, yielding a total area of 14,400 pixels. If that number is divided by eight it yields the number of bytes required for that particular character in a simple bit map representation.

In contrast, the present system requires a tiny fraction of that memory to compress that letter "A" with most scan lines comprising a leading transparent run, an ink run and a null terminator mandating only three bytes in total. Across the gap in the "A" and across the legs thereof, the present imager needs only one-byte for the transparent ink run, a single byte for the next ink run followed by a single byte in the next transparent run, a single byte in the next ink run and then a null terminator. This totals five bytes for that scan line. If all of the scan lines are assumed to take the maximum five bytes, a letter "A" corresponding to one-hundred and twenty scan lines vertically times the five bytes yields six-hundred bytes for the single letter "A" as compared to the 1.8K bytes required for a simple bit map of a non-compressed "A".

For imagers where the pixel resolution is at 2580 DPI there is approximately 7.4K bytes of data for the bit map of the letter "A", whereas with the present imager only two-hundred and fifty eight scan lines in height times the five bytes, or approximately 1.2K bytes of data is needed. As resolution increases this compression results in a substantial savings in memory for each individual character. In sum, memory consumption increases linearly with resolution for characters compressed in accordance with the present imager, whereas simple bit map memory consumption expands geometrically.

As noted above, a list of compressed characters are included with the output data presented from the rastorizer to the graphics accelerator. Another data stream is the list of character impacts on the page which is referred to as the "fast route" character list. This list contains an X, Y, Z and color as well as a pointer to the particular character data for each of the characters on that page. For example if there were a dozen "A's" on the page each would get their own X, Y and Z and color, but the last entry will point to the same character description, that is a compressed entry in the font cache.

FIG. 7 displays a schematic representation of a character activation list 96 generated by the imager of the present invention. Each entry 98 in the character activation list is comprised of four parameters, the first two (100, 102) corresponding to the X and Y location on the page of the upper left-hand corner of a character, while the third entry 104 indicates its "Z" location. That is; at what "depth" it is located relative to other graphics, characters, etc on the page. This is an important parameter since more than one element may share at least part of the same location on the page. The "Z" parameter determines which element or portion thereof ultimately is printed at each page location.

The last entry 106 in the character activation list corresponds to that character's color. With the preferred character activation list, most elements are black or gray. There is an entry in the character activation list for each character which is set on a page regardless of how many times the letter is positioned on the page. The character activation list points to a character cache 108, with pointers repetitively indicating a letter so that letter need only be compressed and stored once per page. For example, only a single "L" need be retained in the character cache with two entries 110, 112 in the character activation list to point to it.

Characters with the present imager are contained within "bounding boxes" rather than the character outline themselves. The present imager tests to see if the character bounding box overlaps another element as opposed to the character itself, because it is less computationally intensive.

As a result, with certain letter combinations, such as upper case "t" and lower case "i", the characters would overlap. The present imager determines that one of the characters has to be reclassified from character to graphics, with all of what that entails. Consequently, this newly reclassified character is compressed differently and is sent to the graphics accelerator to be treated in the "slow" process characteristic of graphics. Moreover, characters that are too large are also reclassified as graphics and are also processed as simple graphics elements. In the preferred embodiment, characters greater than 2 inches tall are treated in this manner. Note also that the present imager collects all characters on a page prior to any evaluation of character overlap, resulting in a dramatic increase in speed in processing. For some pages the increase is on the order of 30%.

The processing of characters in the present invention can be summed as follows. The processor generates a list of all character elements on a page to form a character activation list. The imager checks for characters which must be removed due to (i) overlap, (ii) excess size and (iii) if the character box is clipped by an edge of the allowed region for image elements (i.e., page boundary). These characters so identified are removed from the list and are converted to graphics elements to be processed by the "slow" route.

The output of the rasterizer consists of a character cache which contains run length compressed bit maps of characters. The preferred imager uses eight bit run "inks" where the most significant bit determines whether the run is a "ink" run or a "transparent" run. The least significant seven bits determine the length of that run. A character cache associated with the rasterizer contains all of the letters which are going to be contained in the image. A character activation list contains the information necessary to instruct the imager where to place the characters as well as what color they are to be. Also, graphic data, image data and a palette containing the colors constitute the output signals of the rasterizer as presented to the graphics accelerator. A 16 or 32 bit identifier signifying color, depending on the embodiment, is kept for every pixel on the page.

In the preferred embodiment the character hardware does not support situations where adjacent characters overlap. To compensate, there is a signal filter which finds all intersections between characters at the end of the computation and determines which of the intersecting characters are going to be retained as characters and which are going to be then reclassified as graphics. With the present imager, characters are sent to the graphics accelerator by what is referred to as "fast route" while graphics data are sent by what is referred to as "slow route". Consequently, in those situations such as a capitol "T" followed by a small "i" in which the character "i" would be overlaid by the character "T", the present imager would determine that the character "i" is to be reclassified as a graphic. As detailed hereinafter, graphics are more costly to compress and decompress, given that they are processed as transition point elements.

Those skilled in the art will note that run length compression has been used in the past to save memory with the character cache, but it is only done at larger point sizes because of the overhead of decompressing the character into the bit map. Since these elements are bit map oriented, it is prohibitively expensive in terms of hardware and time for the prior art to do this compression for all characters. However, since the present imager provides for a merger of the characters the compression operations does not require imager resources to keep the characters compressed and more efficient use of memory is the result.

In FIG. 5, the characters which comprise "hello" will each be given a Z value of 1 whereas the graphic circle that appears with the words "Mr. B" will get a Z value of 0 such that if there are any intersections, the element with higher Z value would be printed and the lower one suppressed. The character activation list initially is simply the order of characters placed on a page prior to page "rolling" or format. The character activation list is sorted by Y and X locations so that the characters are sorted into the scan line where they begin and what order on that scan line they are associated.

A font data block is built for every font that is either employed with the imager or where characters have been located in the font cache during interpretation. The font data block contains information about where the font came from, what characters should be coded etc. Attached to each font block is a list of matrix blocks which define the size and orientation of the characters that have been decoded. For instance, the present imager allows for a twelve (12) point TimesRoman character to be employed for the body of a document page and eighteen (18) point TimesRoman for the title. So for every character in a given document that is decoded at twelve (12) points (which might be one-hundred pixels tall), the present imager fixes the twelve (12) point matrix block containing a two-by-two transformation matrix which indicates the scaling and rotation skewing of the character. If the character was written to be vertical, on the side of the paper, etc. then it would be attached to another matrix block for that font. Also, if the present imager decodes some characters from Timesbold, as an example, Timesbold would be indicated to the font matrix block or font data block.

The character font data blocks provide a unique identification signal (ID) for each character. In the present invention the interpreter is completely isolated from the rastorizer so that at the time a character is built it is referred to by that unique ID. When a character is placed in the display list using the "set character" command it is referred to by that ID. Consequently, the rastorizer does not have to maintain the font data structure as does the interpreter because when presented with an ID, it is put into the rastorizer table. When the ID is again presented, the rastorizer simply re-enters that character and does not ascertain what font or what orientation the character has. The rastorizer is programmed only to place that particular bit map at a particular location on the page.

At any point during the display list rasterization process the present imager can determine if the available buffer memory is in danger of being exhausted. If such a condition is found, the present imager writes the entire raster graphic tile image at that moment to an external memory device such as a hard drive. New data is then received by the rasterizer buffer memory with transparent ink used filling the previous page portion. At the end of the rasterization process the two tile images are combined to generate a composite page.

This process is referred to as virtualized memory utilization and is set forth diagrammatically with respect to an algorithm 168 in FIG. 11. The tile is initially, at block 170, considered full of white or transparent ink. The display list is then processed (block 172) until a detector concludes (block 174) that there is an imminent buffer overflow condition. Thereafter, the processor is interrupted such that the entire tile is written to disk storage at block 176. This can be repeated as many times as required.

Signal prep reinitializes the tile with transparent ink at block 178 and continues to process the display list information where it was terminated (block 180). At the completion of the processing for that tile, SignaturePrep provides for a merger or overlay (block 182) of the previous tile image with the subsequently generated tile image to yield a composite tile (block 184) containing all of the tile information. The transparent ink is invisible and is automatically purged.

Referring to FIG. 5, the circle 62, box 60 and box 72 are graphics or background elements that are compressed with transition point format using sixteen byte codes. Graphic data has two parts, a scan line directory which is an ordered list of pointers to the scan lines with a special marker for a blank scan line and a special marker for a duplicate scan line. Each of the scan lines is compressed in transition point format in the form of color-start-color-start-color-start where each of the start positions constitutes a stop as well for 16 bit rastorizers used by the present imager. For 32 bit rastorizers, each scan line is represented by an ordered list of start, color, stop triplets with each of the triplets representing one run of "ink" on the page. In the example shown in FIG. 2, the first several hundred scan lines would all compress zero (0) to represent they were blank scan lines.

The third component of the compressed data is the image data which is a compression of images scanned from a contone imaging element. Image data is treated differently than graphic data by the present imager. Image data is placed on the page by the halftone unit before the graphic data and is written using a special "ink" signal which is referred to as "image ink". When subsequently processed by the graphics accelerator hardware, the image ink is replaced with the actual image data which is stored separately in memory associated with the rasterizer. Each image on a page is assigned an unique ink. Image data for a current image is stored and drawn higher or "less deep" than the previous image on a page. Pixel overlap of image data is resolved by the Z eliminator in a manner similar to the resolution performed by that device on graphics data.

When an image is scanned, it has a typical resolution between 150 or 200 samples per inch. The correct sampling ratio then is between 2 and 2½ times the halftone cell frequency. For a 133 line screen or mesh, the image should be sampled at between 266 and 320 samples per inch. Scanning resolution is normally the same in either the horizontal or vertical directions. For example, if an image was scanned at 300 samples per inch and is being printed on the page in that format with a 2580 pixel per inch, or dpi output device, then in one-three one-hundreds of an inch there are 8.6 pixels. Consequently, each image sample covers 73.96 pixels (8.6 in both vertical and horizontal directions), so that every scan line in this image is repeated 8.6 times. Most scan lines are repeated 9 times, but some are repeated only 8 times because of the limitations in pixel count. Image data is normally compressed in bytes, with one byte of intensity and a single byte corresponding to the number of pixels between 1 and 256. The first byte for each scan line is a repeat count for that scan line of data. The first word of each scan line is the last Y (vertical) value on which that scan line occurred and is equivalent to the sum of all of the repeat counts for the scan lines before it, plus the initial X, Y value.

Image data signals have X, Y and a color values. However with an image, the color indicates only what halftone screen or screens are to be used for that particular image. The color does not indicate the intensities of both screens to be utilized. An image also has a height and width as well as scan lines. Each scan line has a last Y value and a collection of runs, and each run corresponds to an intensity, or an intensity per plane for a color images, with a value to indicate length. In the preferred embodiment, eight bits are used for intensity and eight bits are used for length, although those values are chosen just for efficiency in the preferred embodiment.

In applications where 300 dpi corresponds to 300 samples per inch and each sample corresponds to 8.6 pixels, if the image started on scan line 300 and then the image data on the first scan line would end on line 309 the next bite would be the length which would be the width of the image converted to pixel dimensions for ease of processing accomplished by computing the number in pixels of the width of the image. The next scan line would start and repeat until scan line 318 is repeated as above for each 8.6 or 9 scan lines. In the preferred embodiment, the repeated scan lines of an image are not optimized for compression, but identical scan lines are represented by simply increasing the scan line repeat count.

With the present invention, there is a substantial gain in compression over prior art imagers since when an image run is encountered, the graphics accelerator is presented with signals corresponding to a color and a table instead of presenting the pixels directly. In known imagers each run is generated with all of the transitions therebetween. Image data is processed in the same manner as graphics and any other background data. In contrast, image data is recognized in the present invention as impacting sequential scan lines in substantially the same way with very short runs. Consequently the data for the first scan line can typically be used for the next N scan lines because it is background. With the present invention, a pointer is placed in the bit map which points to the image. The image is ultimately compressed differently as compared to other elements. The present imager generates 6 to 25 fold decrease in memory consumption for simple images, the magnitude of the decrease can be substantially greater for complex images.

At the time the present imager resolves the image data, the image ink marker is replaced with the pointer that points to the scan line of the image data which that image ink represents. Other scan lines are resolved in a similar manner. Thereafter, the present imager includes circuitry for overlap detection which is executed. In FIG. 5, the "E" and "L" intersect the large exclamation point in the background. The "E" and "L" are then drawn using transitions (i.e. treated as graphics rather than characters) into the scan line directory like any other graphic element. In the preferred embodiment, this process is accomplished prior to resolving the multiple transitions on the scan line into a flatten or ordered form. There is also a Z parameter indicator in each of the transitions in the graphic data.

When the compressed graphics and image data signals have been resolved, the resultant signals are modified without loss using the same routines that modify the original compressed data. The present resolution process frees memory, since those compressed graphic or parts thereof that have been subsequently drawn over need no longer be retained. That is; the signals which describe the transitions for a portion of a compressed graphic element which lies at a "lower depth" then the most current or upper most compressed graphic is superfluous. Consequently, memory can be reclaimed when the flattening or resolution process is completed. This "flattening" process as accomplished by the rasterizer prior to presentation to the graphics accelerator circuitry.

The scan lines in compressed form require an identifier to "trim out" or complete the remainder of the scan after the last "ink" run. A count of scan line pixels is used in some applications by the present imager. The scan line trim is later resolved into an ordered list of colors and inks that represent the merging of those inked runs and graphics that are stored in the order that they are drawn so that, when resolved from last drawn to first drawn, there is a correct composite of the page with the correct stacking of graphic elements.

Figure 8:
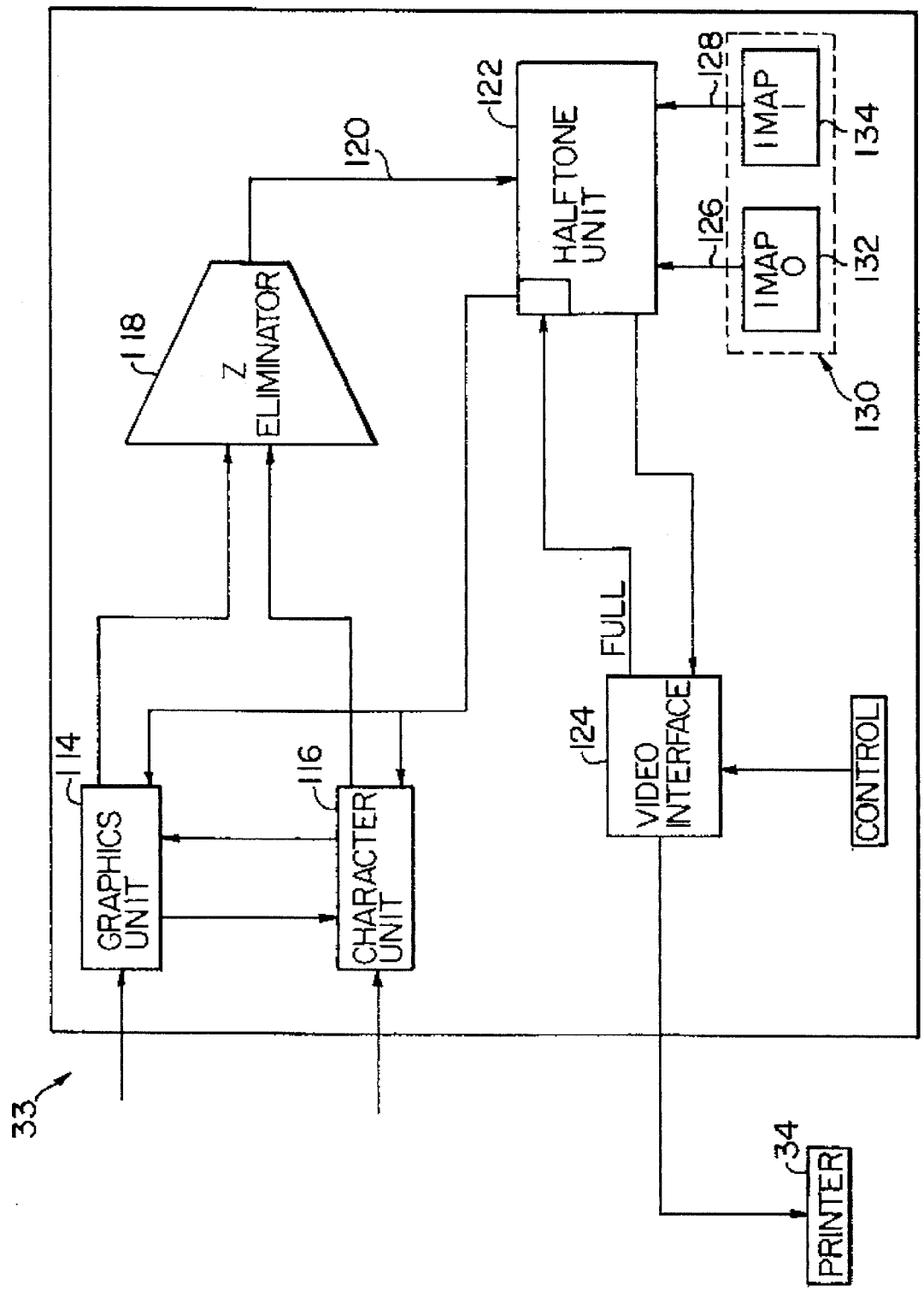
FIG. 8 is a simplified schematic illustration of a graphics accelerator included with the computer imager of FIG. 2.

In FIG. 8, there is shown a detailed illustration of the graphics accelerator 32. Included therein is a graphics unit 114 as well as a character unit 116 which respectively receive graphics and character command signals of 16 bit or 18 bits in width from the rasterizer. Generated therefrom are pixel strings on 16-bit wide data paths which are provided to a "Z eliminator" 118 whose function is to resolve conflicts which develop when more than one element or portion thereof have the same coordinate location.

For example, there may be a graphics element or character which completely or partially overlap on the page. The "Z" eliminator selects which will be hidden when drawn and feeds out the 8 bit intensity associated with that pixel to the halftone unit. In some situations the output signal of the Z eliminator would also include additional bits that enable the halftone selector to select one specific halftone rather than just an intensity out of the halftone. The output of the Z eliminator on line 120 is presented to a halftone unit 122. The output of the halftone unit is provided on a 2-bit wide data path to a video interface 124. The output of the video interface is presented to the printer for printing the overall image on a page.

The operation of the character and graphics units is almost entirely asynchronous, with only the requirement being that neither the character nor the graphics unit will proceed to the next scan line without the other having completed its scan line. If neither can generate a pixel within a selected period, the other is held until they both can generate pixels synchronously. Each of the pixels from either the graphic or character unit is 16 bits in magnitude corresponding to 8 bits of "depth" information (i.e., "Z"), and 8 bits of intensity For embodiments comprising more than one halftone unit, one or more bits are used to select the halftone. These halftone bits are removed from the "Z" field.

The character unit accepts four commands: start, color, transition and End-of-scanline (EOS). The start command indicates the initial position on the page for a character. Color selects the "Z" halftone and intensity for that character The transition command accepts signals corresponding to a pair of runs either both ink, both transparent or one ink and one transparent. The second run is allowed to be zero which produces no pixels. In this way, the present imager generates runs of odd length and not odd numbers of bytes of character data. The last of the four commands, EOS, signals the end of the character data for the current scanline.

The graphics unit accepts four commands: start, color, image run and EOS. As with the character unit, start determines the beginning of a new color. Color selects the "Z" halftone and intensity for a new color. Image run indicates continuous tone data with a length and intensity with the current "Z" and halftone.

Before sending the first run of image ink to the graphics accelerator, the imager presents a graphics color set command signal in order to set the halftone of that image. Thereafter, a run going to the last pixel position on the page is determined by the page width followed by a run corresponding to a graphic in the scan line. The graphic unit then produces pixels as long as it is enabled by the character unit, thereby representing the expansion or decompression of that command sequence. The character unit presents an enable to the graphics unit for as long as the character unit still has pixels to generate. These pixels would be produced by the character unit as well which character impacts the present scan line for the exclamation mark. For the scan line 76 in the letter "A" in FIG. 5, the character unit receives an initialization "X" for example, at pixel location 240, followed by a character color set equal to black, an ink run of 40 pixels and then a character in the scan line. The character unit would produce a series of transparent pixels followed by 20 black pixels then series of transparent pixels.

The Z eliminator receives two color signals—one from the graphic unit and one from the character unit. Each color consists of a value for Z and intensity. With the preferred imager there are 8 bits allotted for each but either could be extended beyond the nominal 8 as needed. The Z value allows the Z eliminator to determine, for each pixel, whether characters or graphics are uppermost, i e., "on top", with that element selected for output. The intensity of the lower and therefore, nonselected element is suppressed. This decision is made for each pixel.

Additionally, the halftone unit receives signals on lines 126, 128 from an intensity map generator 130 whose function is to provide signals corresponding to the intensity of the recorder dots (pixels) which comprise the halftone cell, thereby providing a mapping of intensities and halftone dot shapes. The more pixels that are enabled, the darker will be the corresponding image. The intensity map generator produces two intensity maps 132, 134 being used to generate two pixels in parallel under circumstances as outlined above.

Figure 1:
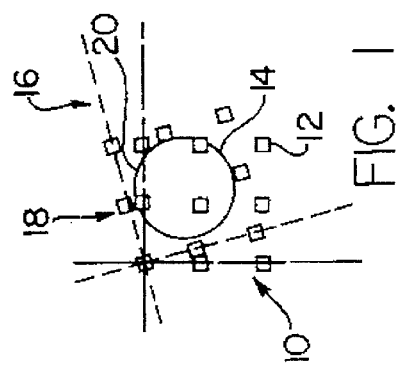
FIG. 1 is a simplified diagrammatic illustration of ideal circular dots of a single cell at two screen angles.

In the imager of FIG. 1 the character and graphics units can comprise 32 bit Cyan-Magenta-Yellow-Black (CMYK) decompression units. The letter "K" rather than "B" is employed in the abbreviation. For a one pass 32 bit CMYK thermal color printer the data requires no translation. For a one pass 4 bit CMYK color printer, the halftone unit outputs four 1-bit pixels generated in parallel. Each pixel is either dithered or halftoned. The preferred decompression units generate a single 1-bit per pixel stream for monochrome bi-level devices like film recorders. Color is done using separation techniques.

Figure 9:
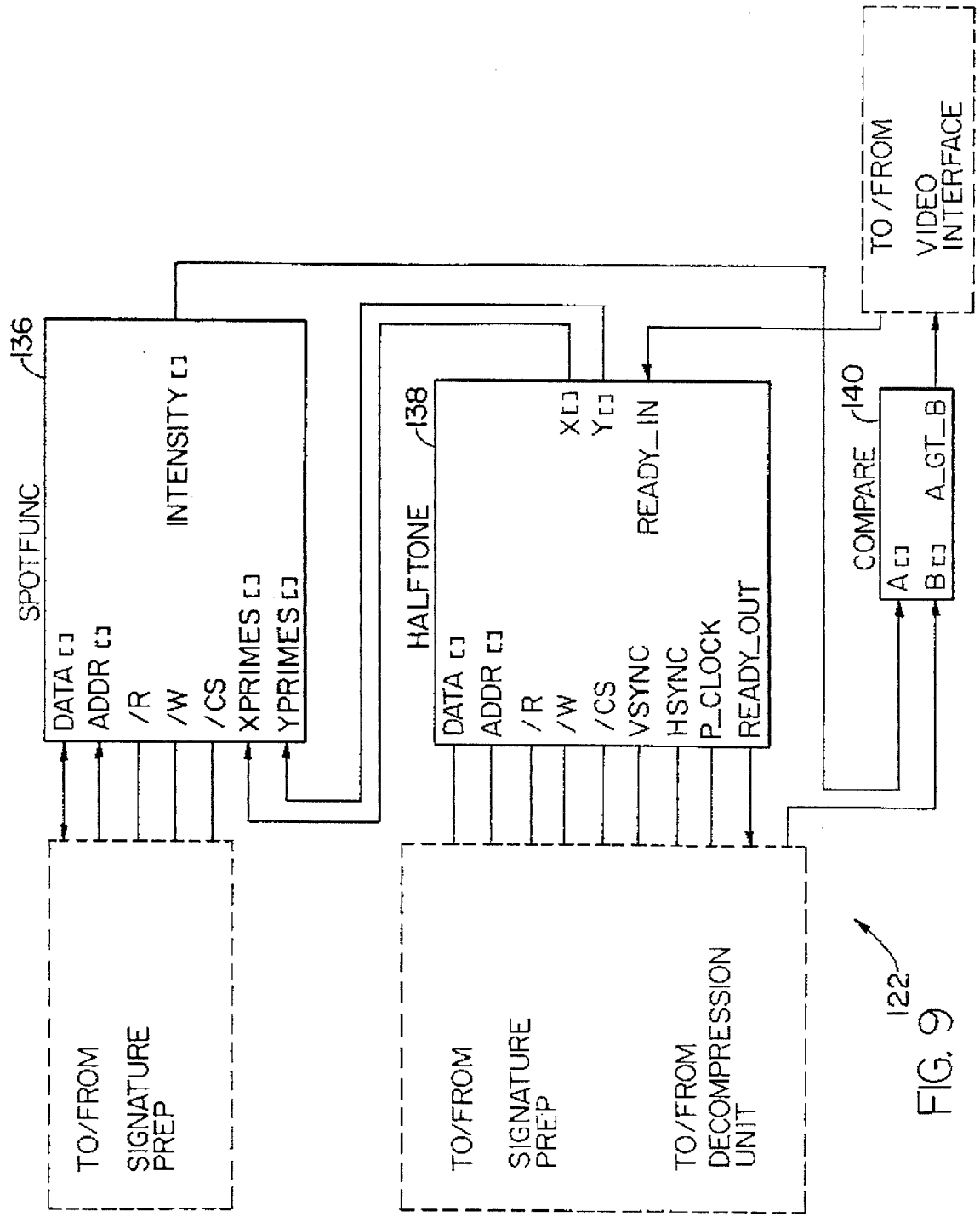
FIG. 9 is a simplified schematic illustration of a halftone unit included with the graphics accelerator of FIG. 8.

The hardware which comprises the halftone unit in the preferred embodiment includes a spot or dot function generator 136, a halftone position unit 138 and a comparator 140 as shown schematically in FIG. 9. The spot function generator and halftone units communicate with SignaturePrep and the data base engine as noted above. The halftone unit additionally communicates with the intensity comparator, decompression hardware and video interface.

Figure 12:
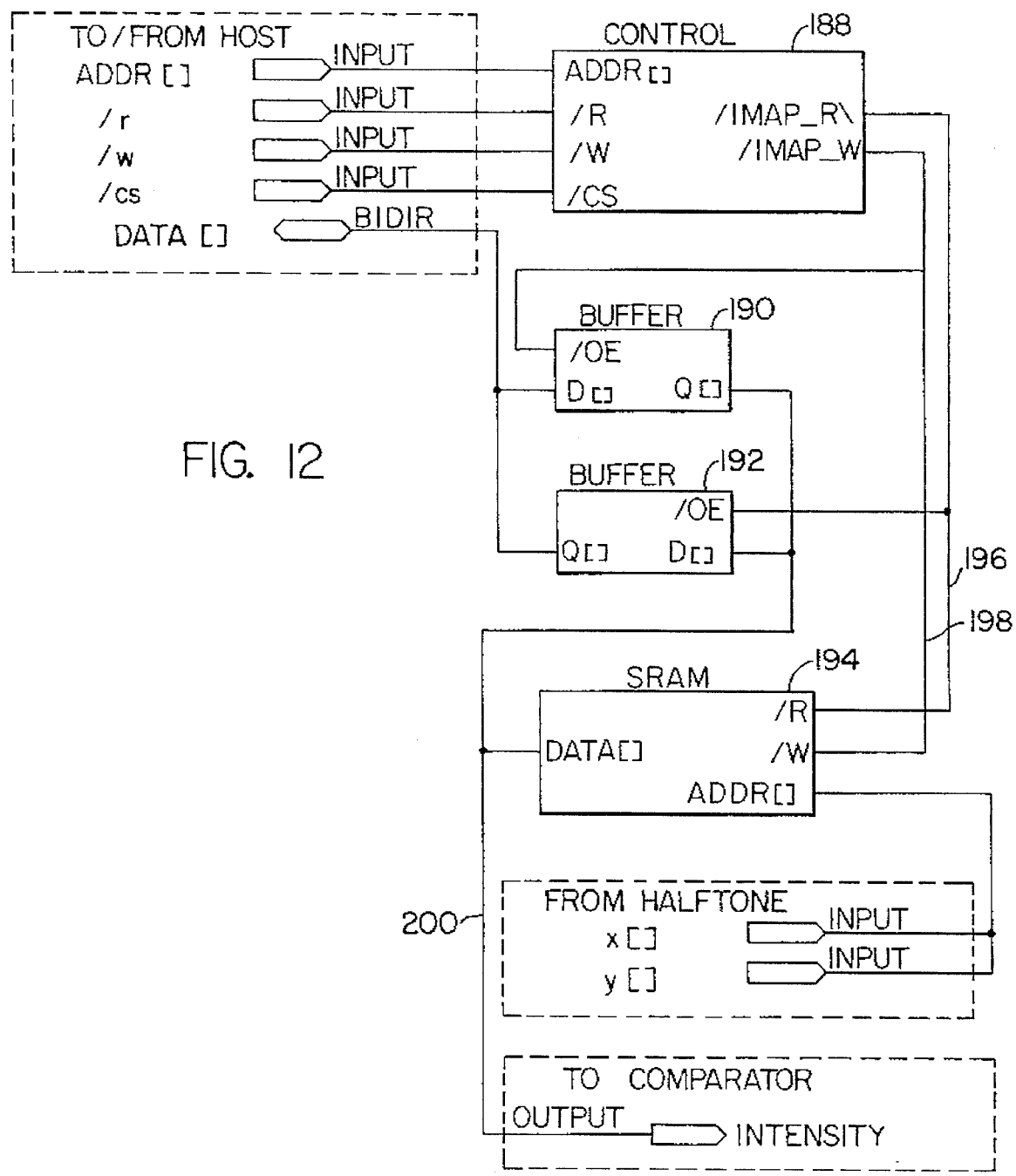
FIG. 12 is a schematic illustration of a spot function generator used in the imager of FIG. 2.

FIG. 12 is a simplified schematic illustration of the spot function generator of FIG. 9. The spot function generator includes a control apparatus 188 which communicates with SignaturePrep and receives signals indicative of the address as well as read and write instructions. Data is provided directly to buffers 190 and 192. The output thereof is passed to a random access memory 194, preferably an SRAM. The SRAM receives control signals from the controller on lines 196 and 198 as well as the address of the current x and y value from the halftone unit. The pixel output is provided to the intensity comparator on line 200.

Figure 13:
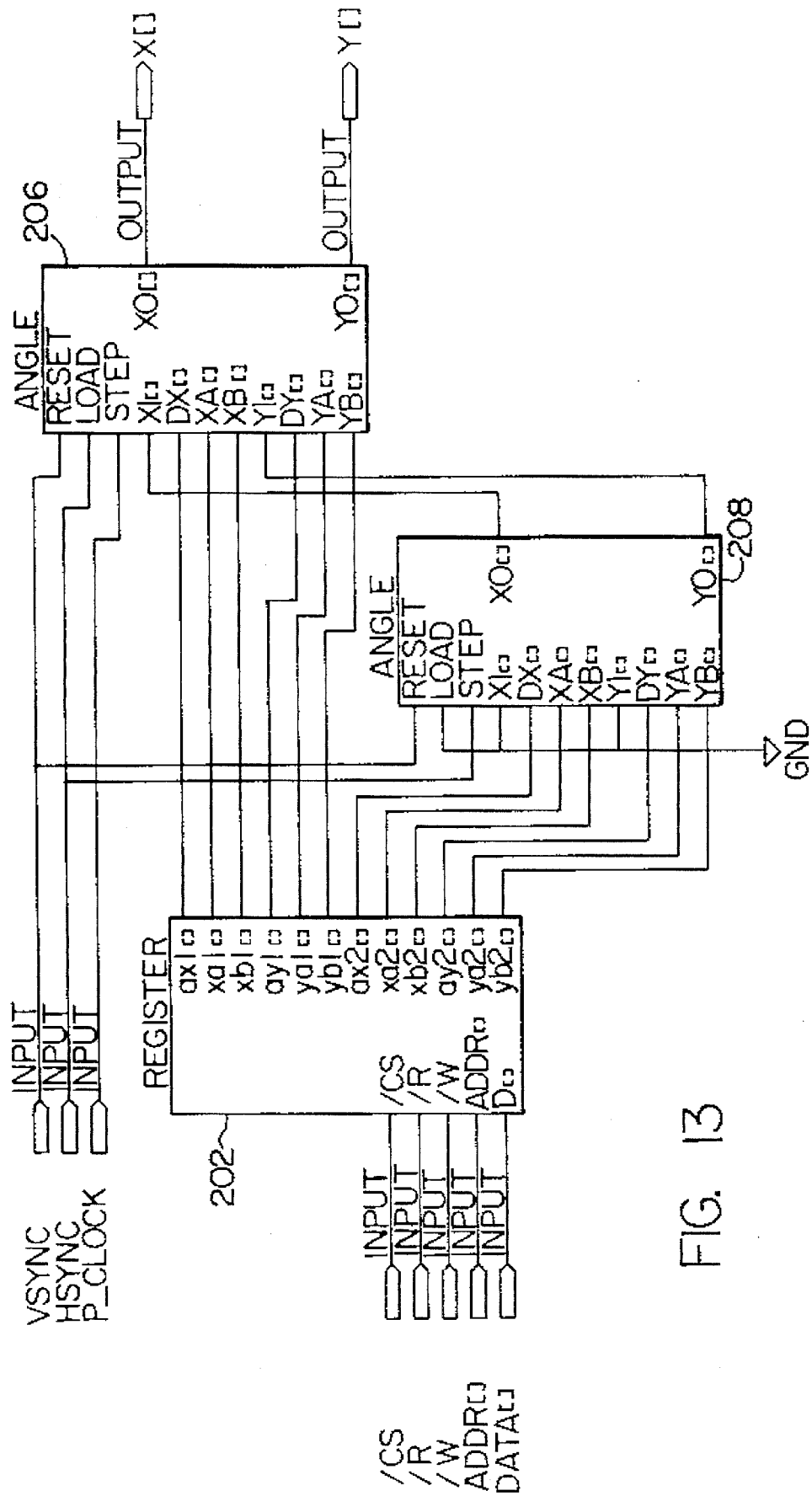
FIG. 13 is a schematic illustration of a halftone unit used in the imager of FIG. 2.

FIG. 13 is a simplified illustration of the halftone unit of FIG. 9. Register 202 receives read and write address and data signals as above and provides signals indicative of Dxy and Dxy for each screen angle to angle units 206 and 208. The output of the angle units is seen by way of reference to FIG. 14. Shown therein is a simplified schematic illustration of the angle unit 206 provided according to the present invention. The angle unit receives a plurality of input signals as noted above with step and reset signal provided to modulo N counters 210 and 212. These counters also receive data input and output, a zero signal on lines 214 and 216, respectively, when a reset condition is encountered. Selected ones of the input signals as well as the output of the modulo end counters are provided to steppers 218 and 220 which output the x and y signals for a given pixel.

Figure 14:
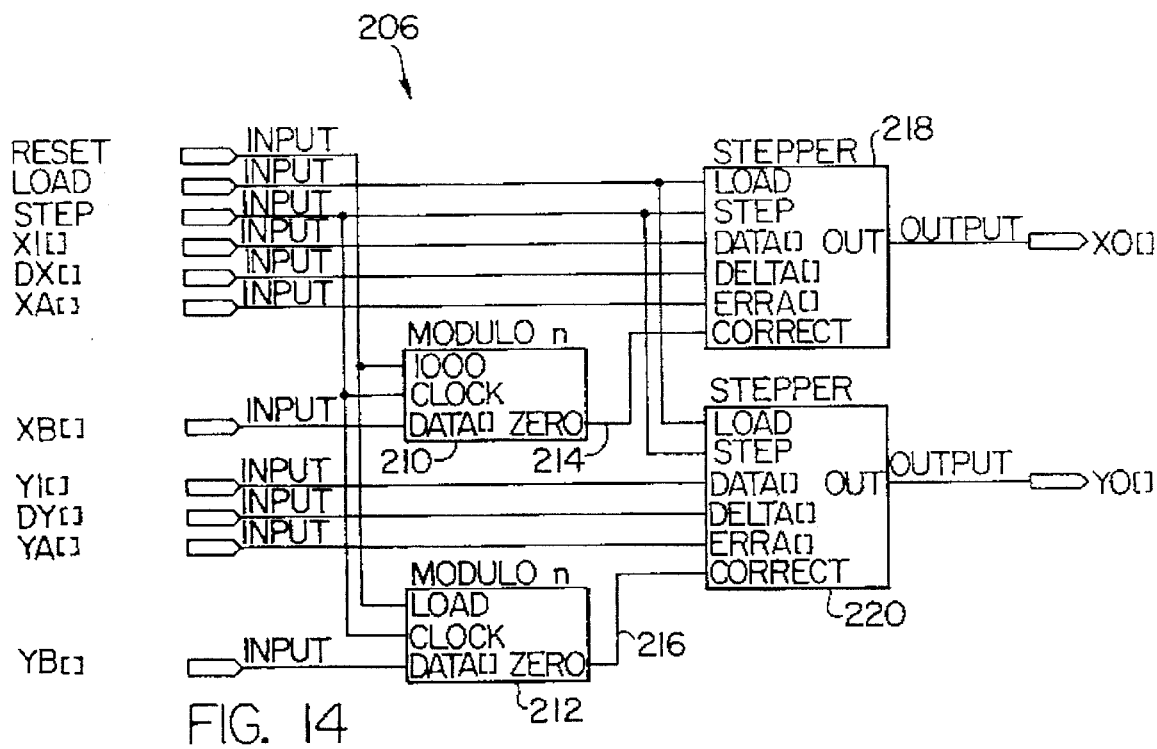
FIG. 14 is a schematic illustration of an angle unit used in the imager of FIG. 2.
Figure 15:
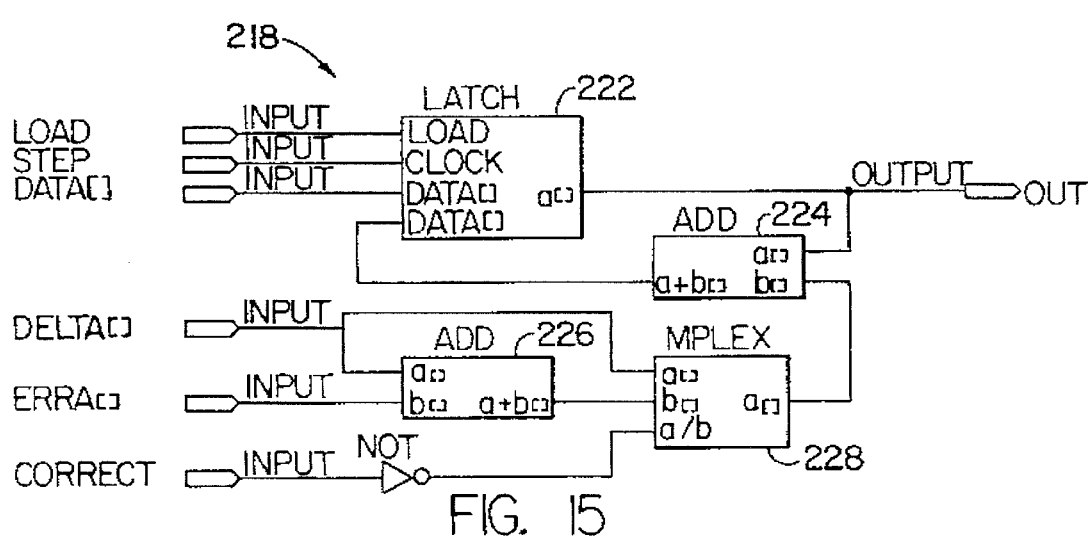
FIG. 15 is a schematic illustration of a stepper circuit used in the imager of FIG. 2.

FIG. 15 illustrates in simplified schematic form the preferred embodiment of stepper 218 of FIG. 14. The stepper is comprised of latch 222 as well as adders 224 and 226. There is a multiplexer 228 also provided generating the output signal for the stepper.

There are, in the preferred embodiment, two angle units, one for the horizontal and vertical directions. It is preferred to reload the horizontal stepper unit from one of the angle units as clocked as by a pixel clock loaded by the horizontal synchronization (hsync) signal while the other angle unit is clocked by the horizontal synchronization signal and loaded by the vertical synchronization (vsync) signal to yield the desired incrementing.

Additionally, with the present halftone unit, there are four registers which are employed to generate signals at 90 degrees from one to another. Alternatively, the imager could employ two registers with negation hardware. However, with the preferred embodiment, the negation is performed in software. The use of four registers allows for different horizontal and vertical resolutions.

More than one of each of these units can be included depending upon the application. The halftone unit preferably includes a plurality of accumulators and latches. Four latches are required if the imager is using different X and Y scales. For each input pixel the spot function generator is sampled at the current X,Y location in paper space for the selected halftone space and compared to the requested intensity. The results of this comparison is presented by the graphics accelerator to the output device.

The operation of the halftone angle or (equivalently) position unit associated with the graphics accelerator is best understood in view of the following. Given a pixel in paper space (x,y), the image of the pixel in an N×N halftone space rotated e degrees is found using:

$$x'=(x*\cos(\Theta)+y*\sin(\Theta))\%N$$

$$y'=(x*\sin(\Theta)-y*\cos(\Theta))\%N$$

To simplify the implementation in the preferred embodiment the spot function is represented as a [0 . . . N] by [0 . . . N] space. A scaling constant is added to the equation to scale from the size of the halftone cell to the fixed size (N×N) of the spot function space as represented by the intensity map. Yielding:

$$x'=R*(x*\cos(\Theta)+y*\sin(\Theta))\%N$$

$$y'=R*(x*\sin(\Theta)-y*\cos(\Theta))\%N$$

For a 1×1 halftone space:

$$x'=(x*R*\cos(\Theta)+y*R*\sin(\Theta))\%1$$

$$y'=(x*R*\sin(\Theta)-y*R*\cos(\Theta))\%1$$

For a given Θ the sine and cosine values are constants The "%" in the equations refers to a modulo operation. An exemplary mesh (M) (in halftone cells per inch) and resolution (DPI) (in pixels per inch) results in:

$$R=M/DPI$$

Thus R*cos(Θ) is constant for a selected halftone. For convenience the following terms are substituted:

$$DX = R*\cos(\Theta)$$

$$DY = R*\sin(\Theta)$$

The preferred halftone angle unit takes advantage of the fact that the pixels are sequentially generated and performs the above function by repeated addition. Every pixel clock cycle:

$$x' = x' + DX$$

$$y' = y' + DY$$

However, this only accounts for motion in the X direction. So at the start of every scan line the imager increments:

$$x' = x'' = x'' + DY$$

$$y' = y'' = y' - DX$$

It is simpler to think of halftone space being 1×1, so the range 0 to 1 is employed for the binary numbers. This is equivalent to assuming the decimal point precedes the largest digit. Thus for a 4 bit number X whose bits are ABCD, the computation becomes $A*2^{-1} + B*2^{-2} + C*2^{-3} + D*2^{-4} = A/2 + B/4 + C/8 + D/16 = X/16$. So 0000–>0, 0001–>1/16, 0010–>1/8 ... 1111–>15/16. Since x', y' x", and y" are represented as binary numbers with a limited number of bits (N) and DX may be irrational, some error may accumulate during the calculation. To reduce this error, error term(s) are added to each equation.

$$x' = x' + DX + error1;$$

$$y' = y' + DY + error2;$$

$$x' = x'' = x'' + DY + error3;$$

$$y' = y'' = y'' - DX + error4;$$

This is implemented by periodically (ever B steps) adding a constant (A) where A/B = errorN. Since A and B are represented by some fixed number of bits, A/B may not exactly equal the error, thus several error terms may be used to improve accuracy. For a 75 degree screen at 133 mesh on a 1200 dpi device:

$$DX = (M/DPI)*\cos(\Theta) = 133/1200*\cos(75) = \sim 0.0286858$$

If DX=0.0286858 in a 12 bit imager, then DX would be represented as 117/4096 or about 0.0285645. Thus an error of (DX−117/4096) or approximately 0.001213 would be accumulated every step. This corresponds to an error of 1 about every 1/error steps or about every 8242 steps. The error term would then be 1/(1/error). To use integers A/B= 1/8242 is used, leaving an accumulated error of (DX−117/ 4096)−1/8242 equal to approximately 0.0000000053723 which amounts to an uncorrected error of 1 every 186 million steps.

Since "1" in this context is one halftone cell, it is desirable to correct for the error more frequently. Conveniently, any A integer can be added where $A = n/(2^{12})$pp and n is a power of 2 less than $2^{12}$. The larger n is, the more accurate the correction, but the correction is also larger and thus more visible in the output. To correct the error in the previous example in 1/16 cell increments the error term would be (256/4096)/515, leaving an uncorrected error of 1 every 28.7 million steps. Also if the error term is initialized to ½ its range, then the error will be −0.5(max error) at the leading edge of the page, zero in the center of the page and +0.5 at the trailing edge.

The halftone position unit converts the current position on the page to a position in a rotated, scaled, modulo'd space referred to as halftone space where the X and Y coordinates are at the requested angle and cycle mesh density. To allow the angle and mesh to be programmable, the halftone position unit is similarly connected to the host system (i.e., receiving data[], addr[], /r /w /cs signals). Those skilled in the art will note that the /r, /w and /cs signals correspond respectively to read, write and chip select signals. The preferred halftone position unit sequentially steps through pixel space during operation. Its operation is controlled by a vertical synchronization signal (vsync) to set the halftone position unit to the origin in paper space (x=0, y=0). A p_clock signal indicates a step to x=x+1, y=y in pixel space, while the hsync signal indicates a step to 0, y=y+1.

In the preferred embodiment the system is clocked at a maximum rate with out regard for the pixel generation rate of the imaging device downstream. To avoid overrunning the imaging device, a ready signal is feed back from the video interface to the decompression unit embodied as a ready_in, ready_out signal, allowing the video interface to halt pixel generation when its buffer is near capacity, e.g., 8 pixels remaining, so several clock cycles are left before data is lost. The comparator compares the intensity requested from the decompression unit to the current intensity received from the dot function generator and decides whether the current pixel is on or off (a_gt_b signal).

The dot function generator converts the current position in halftone space (x[],y[]) to an intensity value (intensity []). In the preferred embodiment the dot function generation process is programmable so the dot function generator is connected to the host system (data[], addr[], /r /w /cs signals). The dot function generator comprises control logic circuits to arbitrate between access by the host system and pixel generation access to a RAM, preferably an SRAM, used to store the dot function presented as an intensity for every x,y in [0 ... 1], [0 ... 1]. The number of discreet values allowed in a cell significantly affects the dot shape quality. It is preferable to use at least 4 times as many samples as there are pixels across the requested halftone cell. In the preferred embodiment there is a sample array of 128 by 128 for each halftone cell. At 1200 dpi different meshes are available in excess of 40 mesh, 1200/(128/4). Typical mesh values employed by printers are 80 to 300 mesh.

Although the X and Y coordinate locations are integers in pixel space, they are not necessarily integers in halftone space after scaling and rotation. In fact, the present imager scales to X and Y between 0 and 1 [0 ... 1], [0 ... 1]. Due to the fact that there are more samples in the dot function than pixels in the output halftone cell, the present imager can produce more than one dot shape for a given requested mesh angle and intensity.

For example, both a 3 by 3 array and a 2 by 4 by 2 array of pixels are reasonable approximations of a circular dot. The difference is that the first array is centered about <x,y>, where x and y are integers representing the center of a pixel. The second array is centered about <x+0.5, y>. The resulting coordinates are not integers even though the original coordinates are because the coefficients used to rotate the halftone space are fractional. Without more samples than pixels in a halftone cell the same dot shape will be produced without regard to placement. An equal number of samples and pixels per halftone cell will yield patterns similar to those found on linen.

During its computation, the halftone unit takes into account the current position of the present scan line on the page and selects the requested intensity. With certain embodiments, the halftone unit determines whether the pixel is "on" or "off" as in cases where the data rate is very high, on the order of 35 megapixels per second. In applications which call for extremely high data rates, the halftone unit will actually generate two pixels for every intensity presented to it, thereby doubling the horizontal resolution and allowing the imager to run the decompression and Z illumination circuitry at half the actual pixel speed which then will produce one pixel for every graphic pixel generated by the character unit.

One of the advantages of the present invention is that the quantization error introduced into the shape of the halftone dot because of the discreet nature of the process. Halftone cells are by definition quantized into a predetermined number of pixels in accordance with the cell dimension, itself determined by the mesh or screen parameters. Consequently, dot shapes as determined by the various colors will be degraded by quantization error because pixels which are located on the edge of a dot will be displaced from color to color (screen to screen) due to the rotation of the halftone grids relative to one another.

However, the present imager is characterized by a halftone unit which utilizes an intensity map of a cell the number of entries in which does not equal the number of cell pixels, but rather is limited only by the size of the precision of computation, i.e., 64×64 samples or 128×128 in the preferred embodiment. For the 9×9 pixel array as set for above, the preferred imager will "oversample" and generate an intensity map of 128×128. This array is divided by 9, the number of pixels. The intensity map is a table of the spot function values sampled at intervals from 0 t 1 in each axis which is used to approximate the spot function values for every pixel. The spot function for a particular location can be determined because the intensity map simply has many more samples than a halftone cell has pixels.

The present imager then does not require an integer number of pixels to a side. This is because the scaling factor(s) which map the M×M halftone cell to the 1×1 intensity map are represented with fractional values. In the formulae set forth hereinabove, this corresponds to the R values. This feature of the present invention is preferably achieved by using one or two more bits of precision in the computation, resulting in an oversampling of the dot generation function with a subsequent scaling back to the number of pixels per halftone cell for that page. Mathematically this is expressed as AX modulo (%) BX where B is a constant. This operation requires that AX=an integer. In contrast A % B requires that A=an integer. Therefore, the present invention allows for noninteger pixel intensity. For example, if 50% intensity is selected for a 9 by 9 pixel halftone cell only 40.5 pixels should be written. For a system with the same number of pixels and samples this will be either 41 out of 81 or 40 out of 81 pixels. In contrast, the present computer imager will alternate between 40 and 41 pixels, yielding an average of 40.5, exactly as requested.

In addition, the present imager compensates for computational error accumulation by the halftone unit. In the preferred embodiment, the error correction is accomplished by the angle units as shown in schematic form in FIG. 14. In operation, the angle unit provides for error correction according to the following. There is a given error in the location of a pixel across a scan line as well as the location of adjacent scan lines in the image bit map. The magnitude of the overall error for a scan line is determined in advance. For example, if the proper error correction corresponds to 7.25, the present invention provides for the compensation to be added into the scan line as follows.

The delta [x],[y] signal would correspond to 7 which is the largest integer for the compensation. The fractional value is obtained by establishing, as in the example, an amount to be accumulated which corresponds to the ERRA, ERRB signals in this case is set equal to 1 and the "correct" signal corresponds then to the frequency of correction which is 4 in this example. For every fourth pixel an additional amount will be added to the output signal, the additional amount being 1. Consequently, the 0.25 fractional value is obtained by adding 1 every forth pixel. The two steppers, of course, are needed for the x and y values in halftone space. In the preferred embodiment, the magnitude of correction number or compensation number is in halftone space and the frequency is in pixel space.

In operation, the incremental error value is added to the pixel position value for sequential pixels until a selected value is reached at which time the modulo N counter resets. The present error correction apparatus requires a minimum number of bits (preferably 8) to maintain the integrity of the image. Those skilled in the art will note that computations using more bits generally yield results with lower error values, but is to be avoided since each bit increase cuts the speed of computation in half.

Figure 16:
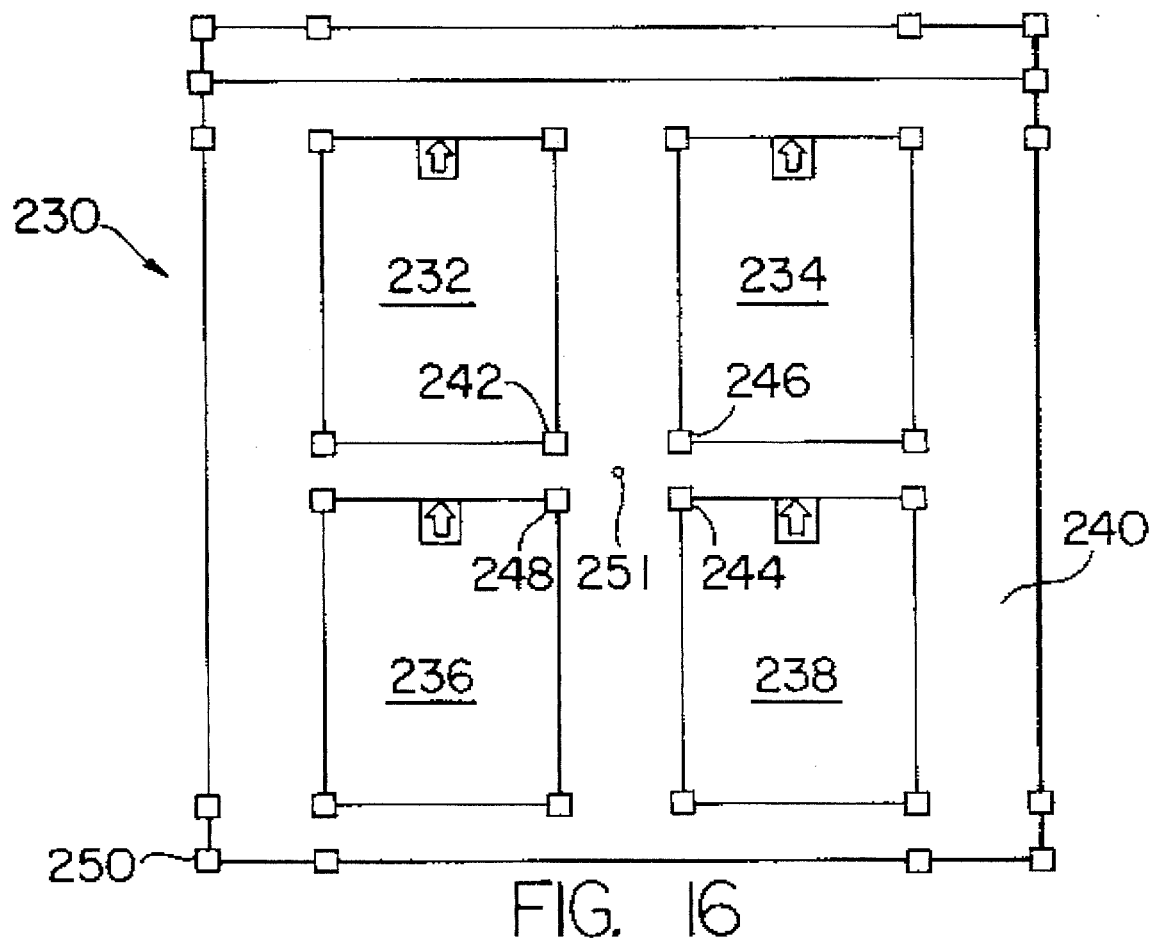
FIG. 16 is a simplified schematic illustration of a scaled representation of a printing plate displayed to the user by the imager of FIG. 2.

Referring now to FIG. 16 there is shown in a simplified schematic form a diagrammatic representation of a printing plate 230. The printing plate is comprised of pages 232, 234, 236 and 238. The pages are set in the field of the page and are surrounded by blank regions 240. Appearing in the page is a plurality of graphical "bullets" such as bullets 244, 246 and 248.

SignaturePrep is also characterized by a unique method and apparatus for graphically assisted placement of user-generated "marks". The term "mark" is, in the printing industry, the term for symbols used for identification and information placed on a printing plate in the blank regions surrounding the actual pages printed. For the present invention, the origin of a coordinate system used to describe the plate is a lower left-hand corner of the plate. The x-axis lies on the left margin along the height of the plate, and the y-axis lies on the bottom margin along the width of the plate. The user is aware of this coordinate system and the insertion point for a mark is displayed in user defined units.

SignaturePrep displays to the user a scaled representation of the printing plate as shown in FIG. 16. The layout of the plate is fully user definable. The imager identifies a number of points on the user's plate which are highly intuitive reference points. These points include the corners of the plate, the intersections of plate margins and gutter margins, and the corners of the pages on the plate. Each of these reference points is mark with a graphical bullet as shown. The graphical bullet is most commonly associated with radio buttons in a graphical user interface. The buttons operate like toggle switches.

There are three basic operations by which marks such as mark 250 can be placed on the plate. The user may move a mark a given distance and direction from any of the available bullets, from its current location, or centered among any number of the available bullets. As an example, to place a mark relative to any of the available bullets, the user, by means of a "mouse" or equivalent, clicks on the desired bullet which is then highlighted. The user provides a distance by typing a value into a type-in field (not shown) and clicks on one of the directions (up, down, right, left). The user clicks on a button labeled "Move Relative To Bullet".

Movement of a mark from its current location is not unlike other manual placement methods and is achieved in precisely the same way movement is achieved when placing marks relative to a single bullet, above, with the obvious exception that a bullet is not chosen (i.e. highlighted). While this does not increase the number of potential locations for the mark (both methods allow the mark to be placed anywhere on the plate), it does provide flexibility and allows the user to approach mark placement using both conventional and somewhat more innovative techniques.

The most useful and potentially time saving method for placing the marks is the third method which allows the user to select two or more of the available bullets. The user enables the "Center Among Bullets" button and the imager computes the center point between the bullets and moves the mark to that point. A special feature allows the user to turn off movement in the x or y direction. In this way, the user can center between two bullets in one axis even if the bullet marks do not share the same coordinate as the opposite axis.

With all movement methods, the user is allowed to specify a justification for the mark. All marks are regarded as rectangular regions. When centering or moving a mark, a single point on the plate is computed. The rectangular region which is the mark may be aligned with this point by place either edge or the center of the region against the computed point in both the x-axis and y-axis. This gives nine possible alignments consisting of one of the three choices for each axis. The alignments are designated as Top, Middle, and Bottom justified in the x-axis, and Center, Left and Right justified in the y-axis.

In FIG. 16, bullets 242 and 244 are highlighted, in essence, clicked by the user. A second click on either button would turn the button off. Centered in the middle of the four pages is mark 250. There are any number of ways in which this mark can be placed in this position. All of the following procedures may be used to place the mark in this centered position: (1) clicking the bullets marked A and B and selecting "Center Among Bullets"; (2) clicking the bullets marked C and D and selecting "Center Among Bullets"; (3) clicking the bullets marked E and F, selecting movement only in the x-axis, and selecting "Center Among Bullets" followed by clicking the bullets marked G and H, selecting movement only in the y-axis and clicking "Center Among Bullets". Note that in all cases, the justification chosen is Center, Middle justified.

Similarly, although the invention has been shown and described with respect to a preferred embodiment thereof, it would be understood by those skilled in the art that other various changes omissions and additions thereto may be made without departing from the spirit and scope of the present invention.

We claim:

1. A halftone computer imaging system for use in generating signals indicative of a sequence of page images included in a document, each of the page images having zero or more character, graphic or image elements, the page images further including a plurality of halftone cells having one or more pixels, said system comprising:

a controller means for receiving command signals indicative of parameters of said page images and generating therefrom imposition signals for configuring said page images into a selected sequence of page images and orientation for printing on one or more printing plates;

an interpreter means adapted to receive from said controller means document signals corresponding to said sequence of page images, the interpreter means including an identifying means for generating signals identifying each element as being a character, graphic or image type element;

a means for generating, for each page, display list signals indicative of element parameters for each element on said page;

a rasterizer means including a compressor means for generating compressed element signals in accordance with said identifying means signals with each of said elements being compressed in accordance with its identified element type, a means for generating character cache signals corresponding to compressed elements identified as characters, a means for generating signals corresponding to a list of compressed characters, a graphics compressor means for generating signals corresponding to compressed graphic elements including a scanline directory having an ordered list of signal pointer signals indicative of compressed representations of the scanlines and marker signals indicative of blank and duplicate scanlines in said graphic element, an image compressor means for generating signals corresponding to compressed image elements with each compressed image element having a lateral (X), vertical (Y) extent on the page and signals corresponding to color, said image compressor means further for generating signals corresponding to intermediate "image ink" marker signals which point to signals stored in memory associated with said system corresponding to the scanline image data signals for that marker signal; and a graphics accelerator means for receiving signals from said rasterizer means and generating therefrom signals for use by an output imaging device for imaging said page images on a medium, said graphics accelerator means including a character decompressor means for use in decompressing signals corresponding to compressed characters received from said rasterizer means, a graphics decompressor means for use in decompressing signals corresponding to compressed graphics and image elements received from said rasterizer means;

a Z eliminator means receiving signals from said character decompressor means corresponding to decompressed signals indicative of said character elements and receiving signals from said graphics decompressor means corresponding to said graphics elements and said image elements, said Z eliminator means merging said received decompressed character, graphic and image signals and, if two of said element types are designated for a given pixel, selecting which of said decompressed character signals or said decompressed graphics signals are to be written for said pixel and suppressing non-selected signals;

an intensity map generator means for generating at least one signal set indicative of the intensity magnitude of the pixels included in each of said halftone cells; and a halftone signal generator means for providing to the output imaging device signals indicative of a selected intensity, said halftone signal generator means including a spot function generator means for sampling said Z eliminator output signals at each pixel location and receiving said signal set from said intensity map generator means and generating therefrom signals indicative of a selected dot shape, a halftone position means for converting the current pixel position on a page to a position in a halftone space scaled therefrom, and a comparator means for comparing the intensity requested from the graphics accelerator means with the intensity of the current pixel received from the spot function generator means and generating signals enabling said current pixel should said requested intensity exceed a threshold value.

2. The halftone computer imaging system of claim 1 wherein said graphics compressor means further comprises a means for compressing said graphics elements in transition point format.

3. The halftone computer imaging system of claim 1 further comprising a tile merger means for providing signals indicative of selected ones of said page images that comprise a selected one of said printing plates to constitute input signals to said graphics accelerator means.

4. The halftone computer imaging system of claim 1 wherein said image compressor means further comprises means for compressing said image elements in an N scan line repeat sequence.

5. The halftone computer imaging system of claim 1 further comprising an intermediate interpreter buffer means for receiving signals from said interpreter means corresponding to interpreted input file signals and providing said signals asynchronously to said rasterizer means in response to received control signals.

6. The halftone computer imaging system of claim 1 wherein said compressor means compresses said characters using signals indicative of beginning of scan line, length of ink run, and scan line end.

7. The halftone computer imaging system of claim 1 further comprising a means for initializing a rasterizer buffer with signals for a first tile corresponding to transparent ink;

a means for processing said display list signals and storing said processed display list signals in said buffer;

indicator means for determining, for the current tile, if said rasterizer buffer approaches capacity and thereupon generating capacity signals to command said rasterizer means to halt display list signal processing at a interim display list signal and store said buffer signals in a rasterizer memory;

a means for reinitializing said rasterizer buffer with a signals for a tile corresponding to transparent ink;

a means for continuing the processing of said display list signals after said interim display list signal and storing said processed display list signals in said buffer; and halftone buffer means for overlaying said current buffer signals with said stored first buffer memory signals to compose the current tile.

8. The halftone computer imaging system of claim 1 wherein said intensity map generator means further comprises an oversampling means for obtaining a number of signal samples for a halftone cell which exceeds the number of pixels in said halftone cell.

9. The halftone computer imaging system of claim 3 wherein said controller means generates signals indicative of page location and orientation on a printing plate.

10. The halftone computer imaging system of claim 3 wherein said controller imposition signals are configured in tiles corresponding to a number of available system signal processors.

11. The halftone computer imaging system of claim 3 wherein said controller further comprises means for adjusting the position said page images relative to an associated one of said printing plates to correct for shingling and bottling.

12. The halftone computer imaging system of claim 1 wherein said interpreter means further comprises means for generating a character activation list including signals indicative of the X and Y position on the page of each character and signals indicative as to character color and what priority the character has on the page, and signals corresponding to which character in said character cache corresponds to the selected letter.

13. The halftone computer imaging system of claim 1 wherein said interpreter means further comprises a character cache means containing signals indicative of all characters to be constructed on a selected page.

14. The halftone computer imaging system of claim 1 wherein said interpreter means further comprises a font cache containing signals indicative of all fonts of characters on a selected page.

15. The halftone computer imaging system of claim 1 further comprising a means for generating signals such that said characters are configured as individual blocks of said pixels, including regions immediately adjacent to a character.

16. The computer imaging system of claim 1 wherein said controller means further comprises a means for generating tile images signals corresponding to a subset of said page image associated with a given one of said plates.

17. The computer imaging system of claim 1 further comprising a database engine means responsive to signals from said controller means, said database engine means for storing said document signals as well as signals generated by said interpreter means and said rasterizer means and providing said stored signals to said graphics accelerator means in response to control signals from said controller means.

18. The halftone computer imaging system of claim 1 wherein said rastorizer means further comprises a means for generating signals indicative of character impacts on a selected page having priority over others of said elements and a means for identifying those of said character elements which are not compressed as characters.

19. The halftone computer imaging system of claim 1 wherein said rastorizer compresses characters using a run length compression algorithm.

20. The halftone computer imaging system of claim 1 wherein said interpreter means and said rastorizer means each provide signals to a plurality of signal processors, said computer imaging system further comprising a means for allocating said processors between rastorizer means and said interpreter means.

21. The halftone computer imaging system of claim 1 further comprising a means for generating initial halftone image signals comprised of a plurality of halftone cells, each of said cells including a plurality of pixels, said halftone imaging system comprising a means for generating subsequent image signals for each cell rotated a preselected angle as compared to said initial cell halftone image signals for each of a plurality of colors.

22. The halftone computer imaging system of claim 1 further comprising a means for generating halftone image signals comprised of a plurality of halftone cells, each of said cells including a plurality of pixels, said halftone imaging system comprising a means for generating subsequent image signals for each cell scaled a preselected amount as compared to said initial halftone image signals for each of a plurality of colors.

23. The halftone computer imaging system of claim 1 wherein said graphics accelerator means further comprises a means for generating more signal samples indicative of pixel intensity than are pixels in a given one of said halftone cells.

24. The halftone computer imaging system of claim 1 wherein said graphics accelerator means further comprises a means for operating said character unit and said graphics unit asynchronously.

25. The halftone computer imaging system of claim 1 wherein said interpreter means further comprises means for generating display lists including, for said characters, signals indicative of complete outlines, font cache management, complex clipping regions, complex shapes, output size (in pixels), fill method, color, complex shapes, character placement, screening information and continuous tone data.

26. The halftone computer imaging system of claim 1 wherein said interpreter means further comprises a means for generating directory signals indicative of the location of each element on a page.

27. The halftone computer imaging system of claim 1 wherein said directory signal generator means further comprises a means for generating character activation list signals indicative of the location of said character on a page, "Z" parameter value and character color.

28. The halftone computer imaging system of claim 1 wherein said halftone signal generator means further comprises:
a means for generating two pixels for every intensity request signal presented thereto, and
a means for operating said character and graphics decompressor means and said Z elimination means at half the speed of pixel generation to produce one pixel for every pixel generated.

29. A method for generating signals indicative of a sequence of page images included in a document, each of said page images having zero or more character, graphic or image elements, said page including a plurality of halftones cells having one or more pixels, said method comprising the steps of:
executing a document signal file corresponding to the sequence of page images to generate an intermediate executable signal file having therein signals corresponding to at least one of said pages of the document that is rotation and position independent,
generating identification signals identifying each element as being a character, graphic or image type element;
generating, for each page, display list signals indicative of element parameters for each element on said page;
generating compressed element signals in accordance with said identification signals with each of said elements being compressed in accordance with its identified element type,
generating character cache signals corresponding to compressed elements identified as characters,
generating signals corresponding of a list of compressed characters,
generating signals corresponding to compressed graphic elements including a scanline directory having an ordered list of signal pointer signals indicative of which scanlines have a graphic element and marker signals indicative of blank and duplicate scan lines in said graphic element,
generating signals corresponding to compressed image elements with each compressed image element having an lateral (X), vertical (Y) extent on the page and signals corresponding to color,
generating signals corresponding to intermediate "image ink" marker signals which point to signals stored in memory corresponding to the scanline image data signals for that marker signal;
decompressing received signals corresponding to compressed character elements,
decompressing signals corresponding to compressed graphics and image elements;
merging decompressed character, graphic and image signals and, if two of said element types are designated for a given pixel, selecting which of said character signals or said graphics signals is to be written for said pixel and suppressing non-selected signals;
generating at least one signal set indicative of the intensity magnitude of the pixels included in each of said halftone cells;
sampling output signals at each pixel location and providing signals of a selected dot shape,
converting the current pixel position on a page to a position in a halftone space scaled therefrom, and
comparing the intensity requested from the rasterizer decompression unit with the intensity of the current pixel received from the dot function generator; and
generating signals enabling said current pixel should said requested intensity exceed a threshold value, thereby providing to an output imaging device signals indicative of a selected intensity.

30. A method for generating signals indicative of a sequence of page images included in a document, each of said page images having at least one character, graphic or image element, said page including a plurality of halftones cells having one or more pixels, said method comprising the steps of:
executing a document signal file corresponding to the sequence of page images to generate an intermediate executable signal file having therein signals corresponding to at least one of said pages of the document that is rotation and position independent,
generating identification signals identifying each element as being a character, graphic or image type element;
generating, for each page, display list signals indicative of element parameters for each element on said page;
generating compressed element signals in accordance with said identification signals with each of said elements being compressed in accordance with its identified element type,
generating character cache signals corresponding to compressed elements identified as characters,
generating signals corresponding of a list of compressed characters,
generating signals corresponding to compressed graphic elements including a scan line directory having an ordered list of signal pointer signals indicative of which scanlines have a graphic element and marker signals indicative of blank and duplicate scan lines in said graphic element,
generating signals corresponding to compressed image elements with each compressed image element having an lateral (X), vertical (Y) extent on the page and signals corresponding to color,
generating signals corresponding to intermediate "image ink" marker signals which point to signals stored in memory corresponding to the scan line image data signals for that marker signal;

decompressing received signals corresponding to compressed character elements, decompressing signals corresponding to compressed graphics and image elements;

merging decompressed character, graphic and image signals and, if two of said element types are designated for a given pixel, selecting which of said character signals or said graphics signals is to be written for said pixel and suppressing non-selected signals;

generating at least one signal set indicative of the intensity magnitude of the pixels included in each of said halftone cells;

sampling output signals at each pixel location and providing signals of a selected dot shape, converting the current pixel position on a page to a position in a halftone space scaled therefrom, and comparing the intensity requested from the rasterizer decompression unit with the intensity of the current pixel received from the dot function generator; and generating signals enabling said current pixel should said requested intensity exceed a threshold value, thereby providing to an output imaging device signals indicative of a selected intensity.

31. The method of claim 29 further comprising the steps of receiving signals from said interpreter means corresponding to interpreted input file signals at an intermediate interpreter buffer means and providing said signal asynchronously to said rasterizer means in response to received control signals.

32. The method of claim 29 further comprising the steps of compressing said characters using signals indicative beginning of scan line, length of ink run, and scan line end.

33. The method of claim 29 further comprising the steps of:

determining, for the current page, if memory associated with said rasterizer means approaches capacity and thereupon generating capacity signals to command said rasterizer means to store in said rasterizer memory signals indicative of a blank (no ink) for the remainder of said current page, and overlaying said rasterizer means buffer memory signals with said signals generated for said current page subsequent to said rasterizer memory capacity signals to compose the current page.

34. The method of claim 29 further comprising the steps of oversampling intensity map signals to obtain a number of signal samples for a halftone cell which exceeds the number of pixels in said halftone cell.

35. The method of claim 29 further comprising the steps of generating signals indicative of page location and orientation on an imaging plate.

36. The method of claim 29 further comprising the steps of presenting signals for interpretation or rasterization to a plurality of signal processors and allocating which of said processors is to perform the steps of rastorizing or interpreting at a given time.

37. The method of claim 29 further comprising the steps of:

generating halftone image signals comprised of a plurality of halftone cells, each of said cells including a plurality of pixels; and generating subsequent image signals for each cell rotated a preselected angle about a selected corner of the halftone cell for each of a plurality of colors.

38. The method of claim 29 further comprising the steps of:

generating halftone image signals comprised of a plurality of halftone cells, each of said cells including a plurality of pixels; and generating subsequent image signals for each cell scaled a preselected amount as compared to said initial halftone image signals for each of a plurality of colors.

39. The method of claim 29 further comprising the steps of generating more signal samples indicative of pixel intensity than are pixels in a given one of said halftone cells.

40. The computer imaging system of claim 1 further comprising error correction means including:

a means for generating signals indicative of a value of approximate total error;

a indicator means for generating signals indicative of the end of an error correction cycle; and a means for adding, in response to signals from said indicator means, said total error signals to the current position signal in halftone space.

41. The computer imaging system of claim 40 wherein said error correction means further comprises a frequency divider signal generator means for providing signals indicative of the expiration of said error correction cycle.

42. The computer imaging system of claim 40 wherein said error correction means further comprises a stepper means generating signals to increment to a next pixel signal from a current pixel signal and for summing said total error signals therewith.

43. The computer imaging system of claim 40 wherein said halftone position means further comprises and error correction means for both X and Y axes.

44. The computer halftone imaging system of claim 40 wherein said total error correction signal generator means further generates signals in a halftone space and said indicator means generates signals in a pixel space; said error correction means further comprises means for multiplying the output of said total error correction signal and said indicator signal by a scaling factor to correct for the difference between halftone and pixel spaces.

45. The computer halftone imaging system of claim 44 wherein said halftone position unit further comprises halftone angle signal generation unit for a first direction and comprises a means for generating halftone angle signals in a second direction orthogonal to said first direction from signals of said halftone angle signal generation unit.

46. The computer halftone imaging system of claim 40 wherein said total error is indicative of a total error value in halftone space.

47. The computer imaging system of claim 1 wherein said interpreter means is adapted to receive an executable document signal file corresponding to said sequence of page images.

48. The computer imaging system of claim 47 wherein said interpreter means further comprises a means for executing the document signal file to generating an intermediate executable signal file having therein signals corresponding to at least one of said pages of the document that is rotation and position independent.

49. The method of claim 29 further comprising the steps of:

initializing a rasterizer buffer with signals for a first tile corresponding to transparent ink;

processing said display list signals and storing said processed display list signals in said buffer;

determining, for the current tile, if said rasterizer buffer approaches capacity and thereupon generating capacity signals to command said rasterizer means to halt display list signal processing at a interim display list signal and store said buffer signals in a rasterizer memory;

reinitializing said rasterizer buffer with a signals for a tile corresponding to transparent ink;

continuing the processing of said display list signals after said interim display list signal;

storing said processed display list signals in said buffer; and overlaying said second buffer signals with said stored first buffer memory signals to compose the current tile.

50. In a computer imaging system for use in generating signals indicative of an overall image having zero or more character elements of a plurality of pixels, the system having a controller for receiving command signals indicative of parameters of the image and generating therefrom imposition signals for configuring the image in a selected sequence and orientation for presentation to an output imaging device, an interpreter adapted to receive signals corresponding to the image, the interpreter having an identifying means for generating signals identifying therefrom pixel signals corresponding to characters, a rasterizer having a compressor means for generating character cache signals corresponding to said characters, a means for generating signals corresponding of a list of characters, the system comprising:

a graphics accelerator means for receiving signals from said rasterizer and generating therefrom signals for use by the output imaging device for imaging the image on a medium, said graphics accelerator means including, a character decompressor means for use in decompressing signals corresponding to compressed characters received from said rasterizer, a Z eliminator means receiving signals from said character decompressor means corresponding to decompressed image signals including signals indicative of said characters, said Z eliminator means merging said received decompressed image signals and, if two of said decompressed image signals are designated for a given pixel, selecting which of said decompressed image signals are to be written for that pixel and suppressing non-selected signals for that pixel; and an intensity map generator means for generating at least one signal set indicative of the intensity magnitude of each of the pixels.

51. A halftone computer imaging system for use in generating signals indicative of a sequence of page images included in a document, each of the page images having zero or more character, graphic or image elements, the page images further including a plurality of halftone cells having one or more pixels, the system having a controller for receiving command signals indicative of parameters of said page images and generating therefrom imposition signals for configuring said page images into a selected sequence of page images and orientation for printing on one or more printing plates; an interpreter adapted to receive document : signals from the controller corresponding to said sequence of page images, the interpreter including an identifying means for generating signals identifying each element as being a character, graphic or image type element; a means for generating, for each page, display list signals indicative of element parameters for each element on said page; a rasterizer having a compressor for generating compressed element signals in accordance with said identifying means signals with each of said elements being compressed in accordance with its identified element type; a means for generating character cache signals corresponding to compressed elements identified as characters, a means for generating signals corresponding to a list of compressed characters, a graphics compressor means for generating signals corresponding to compressed graphic elements including a scanline directory having an ordered list of signal pointer signals indicative of compressed representations of the scanlines and marker signals indicative of blank and duplicate scanlines in said graphic element, an image compressor means for generating signals corresponding to compressed image elements with each compressed image element having a lateral (X), vertical (Y) extent on the page and signals corresponding to color, said image compressor means further for generating signals corresponding to intermediate "image ink" marker signals which point to signals stored in memory associated with said system corresponding to the scanline image data signals for that marker signal; said system comprising:

a graphics accelerator means for receiving signals from said rasterizer and generating therefrom signals for use by an output imaging device for imaging said page images on a medium, said graphics accelerator means including a character decompressor means for use in decompressing signals corresponding to compressed characters received from said rasterizer, and a graphics decompressor means for use in decompressing signals corresponding to compressed graphics and image elements received from said rasterizer;

a Z eliminator means receiving signals from said character decompressor means corresponding to decompressed signals indicative of said character elements and receiving signals from said graphics decompressor means corresponding to said graphics elements and said image elements, said Z eliminator means merging said received decompressed character, graphic and image signals and, if two of said element types are designated a given pixel, selecting which of said decompressed character signals or said decompressed graphics signals are to be written for said pixel and suppressing non-selected signals;

an intensity map generator means for generating at least one signal set indicative of the intensity magnitude of the pixels included in each of said halftone cells; and a halftone signal generator means for providing to the output imaging device signals indicative of a selected intensity, said halftone signal generator means including a spot function generator means for sampling said Z eliminator output signals at each pixel location and receiving said signal set from said intensity map generator means and generating therefrom signals indicative of a selected dot shape, a halftone position means for converting the current pixel position on a page to a position in a halftone space scaled therefrom, and a comparator means for comparing the intensity requested from the graphics accelerator means with the intensity of the current pixel received from the spot function generator means and generating signals enabling said current pixel should said requested intensity exceed a threshold value.

52. The method of claim 29 wherein said display list generating step further comprises the steps of:

determining a list of all character elements designated for a selected page;

identifying all characters which overlap adjacent characters;

identifying all characters which exceed a maximum size threshold;

identifying all characters which extend beyond a page boundary;

removing all of said identified characters from said display list;

converting all of said removed characters to graphic elements.

53. The imaged article of claim 30 wherein said method further comprises the steps of:

initializing a rasterizer buffer with signals for a first tile corresponding to transparent ink;

processing said display list signals and storing said processed display list signals in said buffer;

determining, for the current tile, if said rasterizer buffer approaches capacity and thereupon generating capacity signals to command said rasterizer means to halt display list signal processing at a interim display list signal and store said buffer signals in a rasterizer memory;

reinitializing said rasterizer buffer with a signals for a tile corresponding to transparent ink;

continuing the processing of said display list signals after said interim display list signal;

storing said processed display list signals in said buffer; and overlaying said second buffer signals with said stored first buffer memory signals to compose the current tile.

54. In a computer imaging system for use in generating signals indicative of an overall image having zero or more character elements of a plurality of pixels, the system further having a controller for receiving command signals indicative of parameters of the image and generating therefrom imposition signals for configuring the image in a selected sequence and orientation for presentation to an output imaging device; a rasterizer having a compressor means for generating character cache signals corresponding to said characters, a means for generating signals corresponding to a list of characters; a graphics accelerator for receiving signals from the rasterizer and generating therefrom signals for use by the output imaging device for imaging the image on a medium, the graphics accelerator means including a character decompressor means for use in decompressing signals corresponding to compressed characters received from said rasterizer, a Z eliminator means receiving signals from said character decompressor means corresponding to decompressed image signals including signals indicative of said characters, said Z eliminator means merging said received decompressed image signals and, if two of said decompressed image signals are designated for a given pixel; selecting which of said decompressed image signals are to be written for that pixel and suppressing non-selected signals for that pixel; an intensity map generator means for generating at least one signal set indicative of the intensity magnitude of each of the pixels, the system comprising:

an interpreter means adapted to receive signals corresponding to the image, the interpreter means having an identifying means for generating signals identifying therefrom pixel signals corresponding to characters; and an intermediate interpreter buffer means for receiving signals from said interpreter means for corresponding to interpreted input file signals and providing said signals asynchronously to said rasterizer in response to received control signals.

55. The computer imaging system of claim 54 wherein said interpreter means and said rastorizer means each provide signals to a plurality of signal processors, said computer imaging system further comprising a means for allocating said processors between rastorizer means and said interpreter means.

56. The computer imaging system of claim 54 wherein said interpreter means further comprises a means for executing an image signal file to generate an intermediate executable signal file having therein signals corresponding to at least one signal subset of said image signal file that is rotation and position independent.

57. The method of claim 29 further comprising the steps of:

displaying an image of a printing plate including a plurality of page images spaced thereabout;

displaying a printing mark superimposed on said plate image which is selectably positioned in accordance with received user command signals;

displaying reference point images superimposed on said printing plate images, said reference point images positioned in registration with predetermined page reference points;

generating signals indicative of a desired location of said printing mark; and generating printing mark location signals for presentation to said controller means for including printing mark signals with said page image signals at said printing mark desired location.

58. The method of claim 57 further comprising the steps of receiving user command signals by means of a graphical user interface to position said printing mark in said printing plate and displaying said printing mark location.

* * * * *